US011948544B2

(12) United States Patent
Kajihara et al.

(10) Patent No.: US 11,948,544 B2
(45) Date of Patent: Apr. 2, 2024

(54) MUSICAL INSTRUMENT TUNER, MUSICAL PERFORMANCE SUPPORT DEVICE AND MUSICAL INSTRUMENT MANAGEMENT DEVICE

(71) Applicants: Gotoh Gut Co., Ltd., Isesaki (JP); Gunma Prefecture, Maebashi (JP)

(72) Inventors: Atsushi Kajihara, Maebashi (JP); Masaki Gotoh, Isesaki (JP); Hiroshi Miyajima, Yokohama (JP); Osamu Niijima, Tomioka (JP); Yuta Uchiumi, Tokyo (JP); Makoto Matsumoto, Tokyo (JP); Kento Suzuki, Tokyo (JP)

(73) Assignees: GOTOH GUT CO., LTD., Isesaki (JP); GUNMA PREFECTURE, Maebashi (JP)

( * ) Notice: Subject to any disclaimer, the term of this patent is extended or adjusted under 35 U.S.C. 154(b) by 243 days.

(21) Appl. No.: 17/388,163

(22) Filed: Jul. 29, 2021

(65) Prior Publication Data

US 2021/0358462 A1 Nov. 18, 2021

Related U.S. Application Data

(63) Continuation of application No. PCT/JP2020/002762, filed on Jan. 27, 2020.

(30) Foreign Application Priority Data

Feb. 1, 2019 (JP) ................................ 2019-017270

(51) Int. Cl.
*G10H 1/44* (2006.01)
*G10H 1/36* (2006.01)

(52) U.S. Cl.
CPC ............... *G10H 1/44* (2013.01); *G10H 1/366* (2013.01); *G10H 2210/081* (2013.01); *G10H 2210/091* (2013.01); *G10H 2210/331* (2013.01)

(58) Field of Classification Search
CPC ........................................................ G10H 1/44
See application file for complete search history.

(56) References Cited

U.S. PATENT DOCUMENTS 7,655,851 B2 * 2/2010 Nagakura ................ G10G 7/02 84/312 R
9,240,170 B2 * 1/2016 Chekardzhikov ........ G10D 3/14
(Continued)

FOREIGN PATENT DOCUMENTS

CN 101983403 A 3/2011
CN 102428831 A 4/2012
(Continued)

OTHER PUBLICATIONS

Extended European Search Report for European Application No. 20749776.9, dated Feb. 24, 2022.
(Continued)

*Primary Examiner* — Robert W Horn
(74) *Attorney, Agent, or Firm* — Birch, Stewart, Kolasch & Birch, LLP

(57) ABSTRACT

The musical instrument tuner includes: a sensor device that is attached to a musical instrument; and an operation device that is able to perform wireless communication mutually with the sensor device, in which the sensor device includes an acceleration sensor that has at least two detection axes, frequency detection means for detecting, as a detected frequency, a frequency of a vibration of musical sound generated through an operation of the musical instrument based on an output from the acceleration sensor, and sensor-side communication means for transmitting transmission
(Continued)

information including information regarding the detected frequency to the operation device, and the operation device includes operation-side communication means for receiving the transmission information transmitted from the sensor device, display means, and control means for generating tuning information of the musical instrument and causing the display means to display the tuning information based on the transmission information received from the sensor device.

13 Claims, 15 Drawing Sheets

(56) References Cited

U.S. PATENT DOCUMENTS

| | | | | |
|---|---|---|---|---|
| 9,548,044 | B2 * | 1/2017 | Chekardzhikov | G10D 1/00 |
| 9,812,029 | B1 * | 11/2017 | Henry | G10G 7/00 |
| 9,824,670 | B1 * | 11/2017 | Pahl | G10H 1/0083 |
| 10,636,402 | B2 * | 4/2020 | Liu | G10C 3/26 |
| 10,657,943 | B2 * | 5/2020 | Yan | G10H 1/344 |
| 11,328,618 | B2 * | 5/2022 | Yan | G10F 1/02 |
| 2001/0015123 | A1 | 8/2001 | Nishitani et al. | |
| 2007/0068372 | A1 | 3/2007 | Masuda et al. | |
| 2008/0036915 | A1 | 2/2008 | Nagakura | |
| 2011/0023691 | A1 | 2/2011 | Iwase et al. | |
| 2013/0236869 | A1 | 9/2013 | Sakazaki | |
| 2014/0090547 | A1 | 4/2014 | Udell, III | |
| 2014/0150627 | A1 * | 6/2014 | Chekardzhikov | G10D 1/00 84/455 |
| 2014/0345440 | A1 * | 11/2014 | Harvey | G10G 7/00 84/454 |
| 2015/0082970 | A1 * | 3/2015 | Chekardzhikov | G10H 1/44 84/455 |
| 2016/0042726 | A1 | 2/2016 | Glaser et al. | |
| 2016/0267895 | A1 | 9/2016 | Jeon et al. | |
| 2016/0372097 | A1 * | 12/2016 | Rogers | G10H 1/44 |
| 2018/0342229 | A1 | 11/2018 | Yan et al. | |
| 2018/0357920 | A1 | 12/2018 | Terashima et al. | |
| 2019/0147762 | A1 | 5/2019 | Asahi et al. | |
| 2019/0287505 | A1 * | 9/2019 | Jeon | G10H 3/143 |
| 2021/0287640 | A1 * | 9/2021 | Gilmore | H05B 47/105 |
| 2021/0358323 | A1 * | 11/2021 | Kajihara | G10G 7/00 |
| 2021/0358462 | A1 * | 11/2021 | Kajihara | G10H 1/0016 |

FOREIGN PATENT DOCUMENTS

| | | | |
|---|---|---|---|
| CN | 103310771 | A | 9/2013 |
| CN | 103729062 | A | 4/2014 |
| CN | 105976800 | A | 9/2016 |
| CN | 207624361 | U | 7/2018 |
| JP | 2001-195059 | A | 7/2001 |
| JP | 2001-282095 | A | 10/2001 |
| JP | 2003-223166 | A | 8/2003 |
| JP | 2005-221787 | A | 8/2005 |
| JP | 4367156 | B2 | 11/2009 |
| JP | 2010-181798 | A | 8/2010 |
| JP | 2011-145375 | A | 7/2011 |
| JP | 2011-197528 | A | 10/2011 |
| JP | 2012-141358 | A | 7/2012 |
| JP | 2013-186215 | A | 9/2013 |
| JP | 2016-197776 | A | 11/2016 |
| JP | 2017-97750 | A | 6/2017 |
| JP | 2017-194826 | A | 10/2017 |
| WO | WO 2006/043469 | A1 | 4/2006 |
| WO | WO 2017/000047 | A1 | 1/2017 |
| WO | WO 2017/082061 | A1 | 5/2017 |
| WO | WO 2018/012590 | A1 | 1/2018 |
| WO | WO2018/068203 | A1 | 4/2018 |

OTHER PUBLICATIONS

Japanese Office Action for corresponding Japanese Application No. 2019-017270, dated Mar. 31, 2023, with English translation.

International Preliminary Report on Patentability (Form PCT/IPEA/409) for International Application No. PCT/JP2020/002762, dated Apr. 26, 2021, with English translation.

International Preliminary Report on Patentability and Written Opinion of the International Searching Authority (Forms PCT/IB/338, PCT/IB/373, and PCT/ISA/237) for International Application No. PCT/JP2020/002763, dated Jul. 27, 2021, with English translation of the Written Opinion.

Chinese Office Action issued in Chinese Application No. 202080012028.0 dated Dec. 6, 2022, with English translation.

Chinese Office Action and Search Report dated Apr. 3, 2023 for Application No. 202080012028.0 with an English translation.

Extended European Search Report for corresponding European Application No. 20749376.8, dated Feb. 7, 2022.

International Search Report, issued in PCT/JP2020/002762, PCT/ISA/210, dated Apr. 21, 2020.

International Search Report, issued in PCT/JP2020/002763, PCT/ISA/210, dated Mar. 31, 2020.

European Communication pursuant to Article 94(3) EPC for corresponding European Application No. 20749376.8, dated Jan. 16, 2023.

Japanese Office Action for Japanese Application No. 2019-017274, dated Jan. 25, 2023, with English translation. Document does not correlate to the prior art of the inventors, Kajihara et al. and to closely related subject matter. The technical feature is a loss prevention system rather than a musical instrument tuner.

Japanese Office Action for corresponding Japanese Application No. 2019-017270, dated Dec. 5, 2022, with English translation.

* cited by examiner

MUSICAL INSTRUMENT TUNER, MUSICAL PERFORMANCE SUPPORT DEVICE AND MUSICAL INSTRUMENT MANAGEMENT DEVICE

CROSS-REFERENCE TO RELATED APPLICATIONS

The present application is a Continuation of PCT International Application No. PCT/JP2020/002762 filed on Jan. 27, 2020 claiming priority under 35 U.S.C § 119(a) to Japanese Patent Application No. 2019-017270 filed on Feb. 1, 2019. Each of the above applications is hereby expressly incorporated by reference, in their entirety, into the present application.

BACKGROUND OF THE INVENTION

1. Field of the Invention

The present invention relates to a musical instrument tuner used to tune musical instruments, a musical performance support device, and a musical instrument management device.

2. Description of the Related Art

In the related art, tuners used to tune musical instruments such as guitars, violins, pianos, saxophones, trumpets, and flutes are known (see PTL 1 and PTL 2, for example).

A tuner in the related art is typically configured with a power source such as a battery for causing the entire device to operate, a vibration sensor that detects vibrations of musical sound generated through operations of a musical instrument, operation means such as a switch for inputting ON/OFF of the power source, tuning setting conditions, display conditions, and the like, display means for displaying the tuning setting conditions and a tuning state, and a calculator (CPU) that performs calculation based on inputs from the vibration sensor and the operation means and causing the display means to display information.

In a case of a string musical instrument such as a guitar, for example, a tuner is typically attached to a head portion of the string musical instrument. Once a string as a target of tuning in the string musical instrument is operated, a vibration of musical sound generated through the operation is detected based on an output signal from a vibration sensor. Then, a frequency deviation between a detected frequency and a reference frequency is detected, and tuning information is displayed on the display means based on the detection result. In this manner, a player can tune the musical instrument while checking the tuning information displayed on the display means.

PTL 1: Japanese Patent Application Laid-Open No. 2010-181798

PTL 2: Japanese Patent Application Laid-Open No. 2012-141358

SUMMARY OF THE INVENTION

However, since a sensitivity direction of the vibration sensor included in the tuner in the related art is only a direction of one axis, sensitivity of the vibration sensor may be insufficient depending on a posture (attachment state) of the tuner attached to the musical instrument, and vibrations of musical sound generated from the musical instrument may not be appropriately captured.

As one of countermeasures therefor, defining of an attachment position and an orientation of the tuner relative to the musical instrument is conceivable. It is thus possible to dispose the tuner to maximize the sensitivity of the vibration sensor in response to vibrations of musical sound generated from the musical instrument. However, such a countermeasure may limit designs of the musical instrument and the tuner, and there is a problem of poor usability for the player.

In addition, vibrations in the sensitivity direction of the vibration sensor are weak while vibrations in the other directions are strongly output at a specific frequency due to characteristics of the musical instrument in some cases. In such cases, the tuner in the related art cannot accurately tune the musical instrument due to directionality caused by the sensitivity of the vibration sensor only in the direction of one axis.

Although PTL 1 and PTL 2 disclose tuners including vibration sensors, there are no mentions regarding these problems, and it is a matter of course that no description and indication are included in regard to means for solving the problems.

The present invention was made in view of such circumstances, and an object thereof is to provide a musical instrument tuner capable of providing satisfactory usability and performing stable and accurate tuning. A further object of the present invention is to provide a musical performance support device and a musical instrument management device that can be realized using functions provided in the musical instrument tuner.

In order to solve the aforementioned problem, a musical instrument tuner according to a first aspect of the present invention is a musical instrument tuner including: a sensor device that is attached to a musical instrument; and an operation device that is able to perform wireless communication mutually with the sensor device, in which the sensor device includes an acceleration sensor that has at least two detection axes, frequency detection means for detecting, as a detected frequency, a frequency of a vibration of musical sound generated through an operation of the musical instrument based on an output from the acceleration sensor, and sensor-side communication means for transmitting transmission information including information regarding the detected frequency to the operation device, and the operation device includes operation-side communication means for receiving the transmission information transmitted from the sensor device, display means, and control means for generating tuning information of the musical instrument and causing the display means to display the tuning information based on the transmission information received from the sensor device.

According to the first aspect, the accelerator sensor that has the two or more detection axes is included, and it is thus possible to provide satisfactory usability and to perform stable and accurate tuning.

In the musical instrument tuner according to a second aspect of the present invention, the acceleration sensor is a three-axis acceleration sensor that has three detection axes, in the first aspect.

In the musical instrument tuner according to a third aspect of the present invention, the operation device further includes frequency deviation detection means for detecting a frequency deviation between the detected frequency and a reference frequency corresponding to a name of pitch that is a target of tuning, in the first or second aspect.

In the musical instrument tuner according to a fourth aspect of the present invention, the operation device includes operation means for receiving a setting operation for the target of tuning, and the frequency deviation detection means sets the reference frequency based on the setting operation received by the operation means, in the third aspect.

In the musical instrument tuner according to a fifth aspect of the present invention, the frequency deviation detection means sets the reference frequency based on the detected frequency detected by the frequency detection means, in the third or fourth aspect.

In the musical instrument tuner according to a sixth aspect of the present invention, the sensor device includes posture detection means for detecting posture information of the musical instrument based on an output from the acceleration sensor, and the frequency deviation detection means sets the reference frequency based on the posture information detected by the posture detection means, in any of the third to fifth aspects.

A musical instrument tuner according to a seventh aspect of the present invention is an musical instrument tuner including: a sensor device that is attached to a musical instrument; and an operation device that is able to perform wireless communication mutually with the sensor device, in which the sensor device includes an acceleration sensor, frequency detection means for detecting, as a detected frequency, a frequency of a vibration of musical sound generated through an operation of the musical instrument based on an output from the acceleration sensor, posture detection means for detecting posture information of the musical instrument based on an output from the acceleration sensor, and sensor-side communication means for transmitting transmission information including information regarding the detected frequency to the operation device, and the operation device includes operation-side communication means for receiving the transmission information transmitted from the sensor device, display means, and control means for generating tuning information of the musical instrument and causing the display means to display the tuning information based on the transmission information received from the sensor device.

In the musical instrument tuner according to an eighth aspect of the present invention, the sensor-side communication means transmits a detection signal output from the acceleration sensor to the operation device, the operation-side communication means receives the detection signal transmitted from the sensor device, and the control means generates musical performance support information for assisting musical performance of a user in accordance with the detection signal during the musical performance of the musical instrument and controls display on the display means based on the musical performance support information, in any of the first to seventh aspects.

In the musical instrument tuner according to a ninth aspect of the present invention, the control means evaluates a musical performance state in accordance with the detection signal and causes the display means to display a result of the evaluation of the musical performance state, in the eighth aspect.

In the musical instrument tuner according to a tenth aspect of the present invention, the control means transmits a command in accordance with the detection signal to an external device communicably connected to the operation device, in the eighth or ninth aspect.

In the musical instrument tuner according to an eleventh aspect of the present invention, the control means causes the display means to display a musical score, detects a progress state of musical performance in accordance with the detection signal, and performs display indicating a part that is being played on the musical score, or turns a page of the musical score, in accordance with the progress state of the musical performance, in any of the eighth to tenth aspects.

In the musical instrument tuner according to a twelfth aspect of the present invention, the sensor-side communication means transmits a detection signal output from the acceleration sensor to the operation device, the operation device further includes alert output means, and the control means causes the alert output means to output an alert in a case in which a motion is detected by the acceleration sensor when the musical instrument with the sensor device attached thereto is not used, in any of the first to eleventh aspects.

In the musical instrument tuner according to a thirteenth aspect of the present invention, the operation device further includes alert output means, and the control means causes the alert output means to output an alert in a case in which disconnection of a link state between the sensor device and the operation device is detected, in any of the first to eleventh aspects.

In the musical instrument tuner according to a fourteenth aspect of the present invention, the operation device further includes position information storage means, and the control means acquires position information of the operation device at a timing when the disconnection of the link state is detected or position information of the operation device immediately before the disconnection of the link state is detected and stores the position information in the position information storage means in a case in which the disconnection of the link state between the sensor device and the operation device is detected, in the thirteenth aspect.

A musical performance support device according to a fifteenth aspect of the present invention includes: a sensor device that is attached to a musical instrument; and an operation device that is able to perform wireless communication mutually with the sensor device, the sensor device including an acceleration sensor and sensor-side communication means for transmitting a detection signal output from the acceleration sensor to the operation device, and the operation device including operation-side communication means for receiving the detection signal transmitted from the sensor device, display means, and control means for generating musical performance support information for assisting musical performance of a user in accordance with the detection signal during the musical performance of the musical instrument and controlling display on the display means based on the musical performance support information.

A musical instrument management device according to a sixteenth aspect of the present invention includes: a sensor device that is attached to a musical instrument; and an operation device that is able to perform wireless communication mutually with the sensor device, the sensor device including an acceleration sensor and sensor-side communication means for transmitting a detection signal output from the acceleration sensor to the operation device, the operation device including operation-side communication means for receiving the detection signal transmitted from the sensor device, alert output means, and control means for causing the alert output means to output an alert in a case in which a motion is detected by the acceleration sensor when the musical instrument with the sensor device attached thereto is not used.

A musical instrument management device according to a seventeenth aspect of the present invention includes: a sensor device that is attached to a musical instrument; and an operation device that is able to perform wireless communication mutually with the sensor device, the sensor device including an acceleration sensor and sensor-side communication means for transmitting a detection signal output from the acceleration sensor to the operation device, the operation device including operation-side communication means for receiving the detection signal transmitted from the sensor device, alert output means, and control means for causing the alert output means to output an alert in a case in which disconnection of a link state between the sensor device and the operation device is detected.

The present invention enables satisfactory usability and stable and accurate tuning to be achieved.

DESCRIPTION OF THE PREFERRED EMBODIMENTS

Hereinafter, embodiments of a musical instrument tuner, a musical performance support device, and a musical instrument management device according to the present invention will be described in accordance with accompanying drawings.

First Embodiment

Figure 1:
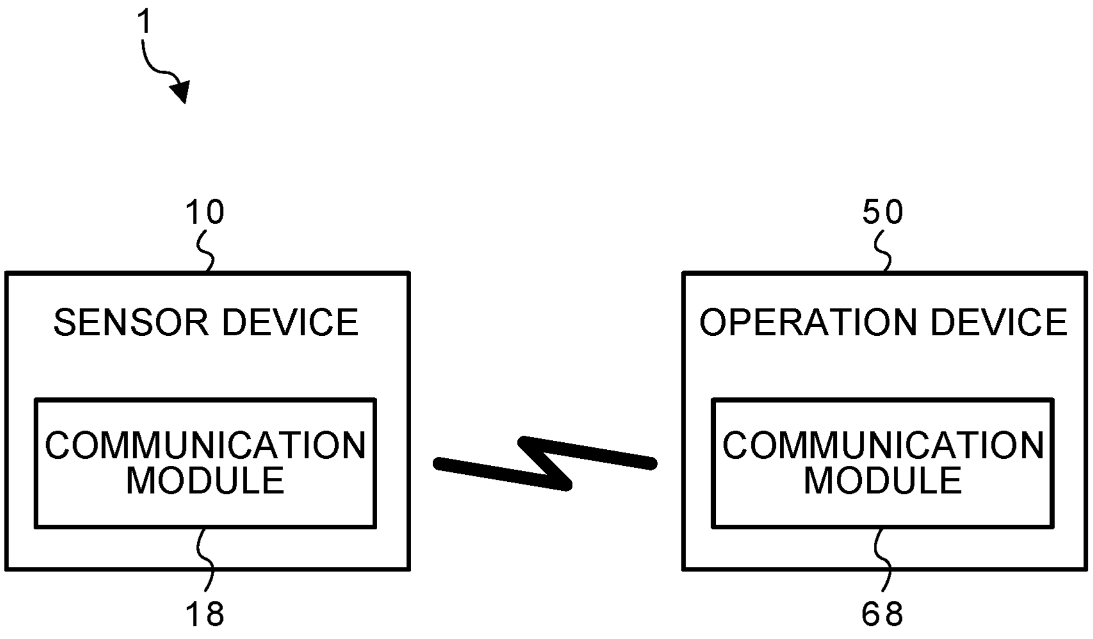
FIG. 1 is a block diagram illustrating a musical instrument tuner according to a first embodiment of the present invention.

FIG. 1 is a block diagram illustrating a musical instrument tuner according to a first embodiment of the present invention.

As illustrated in FIG. 1, a musical instrument tuner 1 according to the embodiment includes a sensor device 10 and an operation device 50. The sensor device 10 and the operation device 50 can perform wireless communication with each other. As a communication scheme between the sensor device 10 and the operation device 50, it is possible to employ a wireless local area network (LAN), WiFi (registered trademark), Bluetooth (registered trademark), a wide area network (WAN), or the like.

Figure 3:
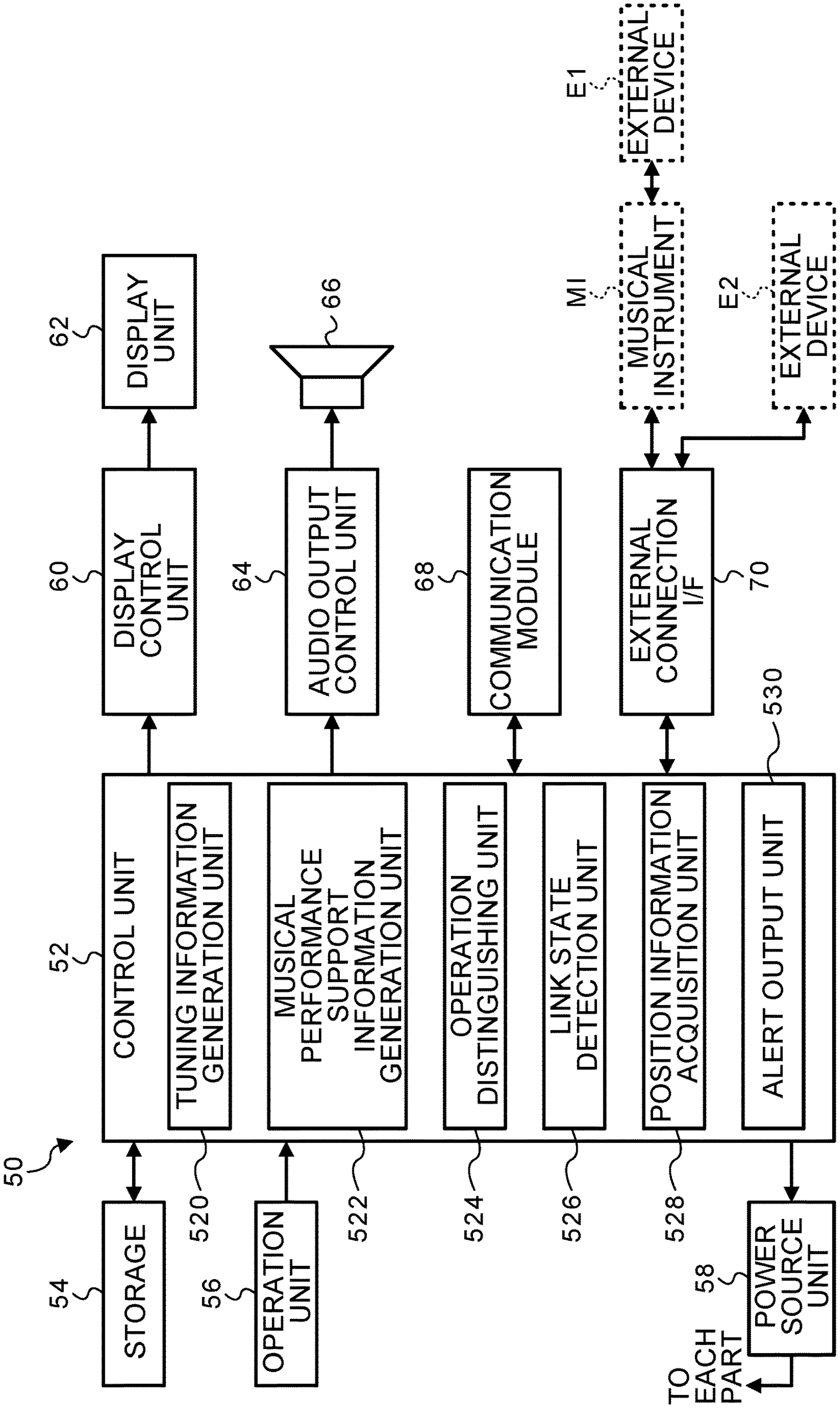
FIG. 3 is a block diagram illustrating an operation device according to the first embodiment of the present invention.

The sensor device 10 is attached to a musical instrument MI (see FIG. 3). In a case in which the musical instrument MI is a guitar, for example, the sensor device 10 can be attached to a head of the guitar with a clip. A method of attaching the sensor device 10 to the musical instrument MI is not particularly limited and can be selected in accordance with the shape of the sensor device 10 and the shape and the type of the musical instrument. The sensor device 10 may be attached directly to the musical instrument MI by a method of an adhesive scheme or screwing, for example, or may be attached indirectly to the musical instrument MI via an attachment such as a clip.

The sensor device 10 converts acoustic sound or a vibration generated by the musical instrument MI into an electric signal (acoustic signal) to create transmission information and transmits the transmission information to the operation device 50.

The operation device 50 demodulates the transmission information received from the sensor device 10 to acquire the acoustic signal. Then, the operation device 50 analyzes the acoustic signal, creates tuning information required to tune the musical instrument MI, and causes a display unit 62 (see FIG. 3) to display the tuning information. In this manner, a player (hereinafter, referred to as a user) of the musical instrument MI can tune the musical instrument MI while checking the display of the tuning information.

(Sensor Device)

Figure 2:
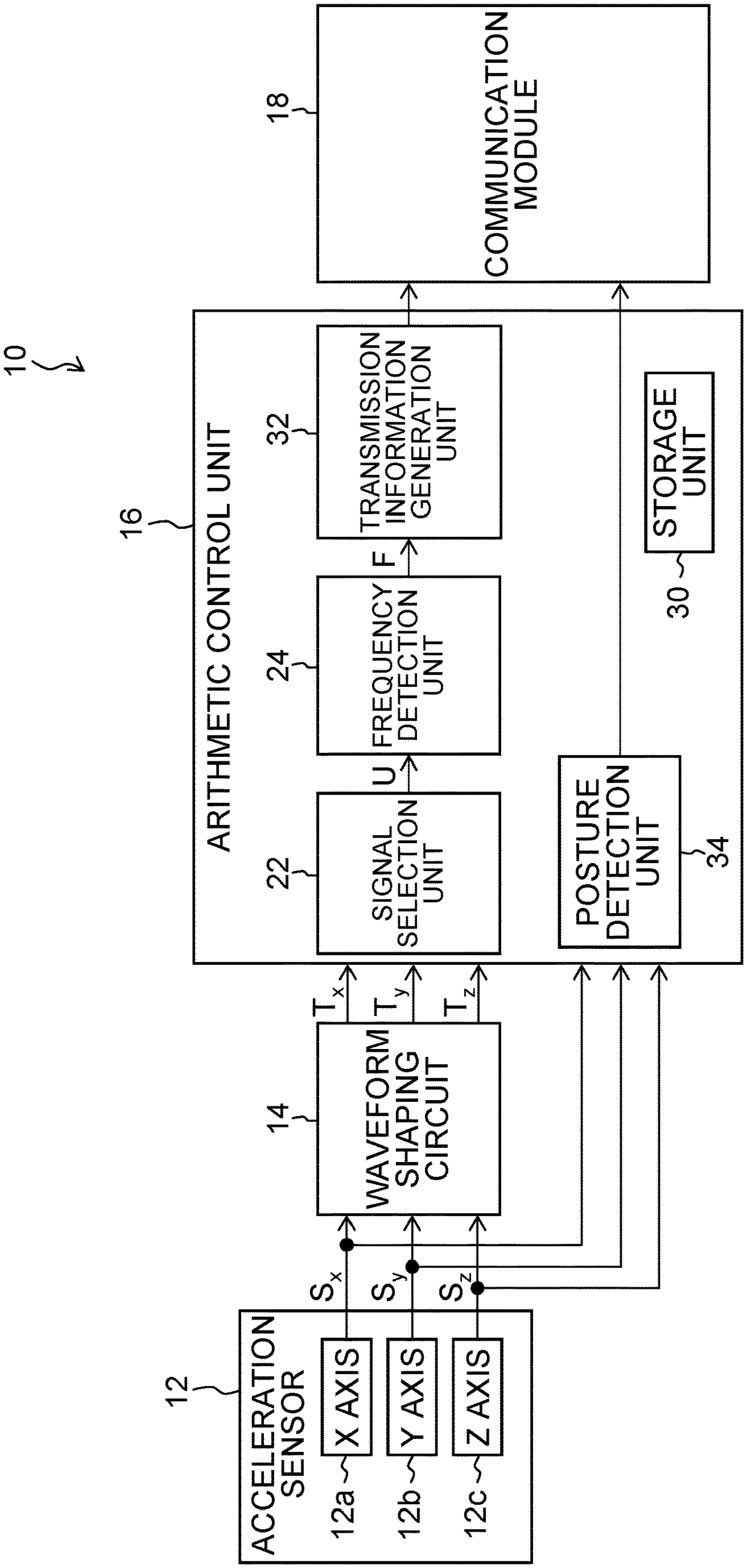
FIG. 2 is a block diagram illustrating a sensor device according to the first embodiment of the present invention.

FIG. 2 is a block diagram illustrating the sensor device according to the first embodiment of the present invention. As illustrated in FIG. 2, the sensor device 10 according to the embodiment includes an acceleration sensor 12, a waveform shaping circuit 14, an arithmetic control unit 16, and a communication module 18. Also, the sensor device 10 includes a power source unit that supplies a power source for causing each part of the sensor device 10 to operate although illustration thereof is omitted. The power source unit is configured with a primary cell or a secondary cell.

The acceleration sensor 12 is configured with a three-axis acceleration sensor having three detection axes (an X axis, a Y axis, and a Z axis) that orthogonally intersect each other. The acceleration sensor 12 has three sensors 12*a*, 12*b*, and 12*c* corresponding to the detection axes and outputs detection signals $S_x$, $S_y$, and $S_z$ for the corresponding detection axes from the sensors 12*a*, 12*b*, and 12*c*, respectively (hereinafter, referred to as "output signals $S_x$, $S_y$, and $S_z$ of the acceleration sensor 12"). The output signals $S_x$, $S_y$, and $S_z$ of the acceleration sensor 12 are output to the waveform shaping circuit 14. The values of acceleration may be output as alternating current values in accordance with frequencies of vibrations. Note that the acceleration sensor 12 may be of a digital output type that outputs the output signals $S_x$, $S_y$, and $S_z$ as digital signals or may be of an analog output type that outputs the output signals $S_x$, $S_y$, and $S_z$ as analog signals. However, the analog output type does not cause a delay due to analog-to-digital (A/D) conversion, communication, or the like as compared with the digital output type, thus has high responsiveness to changes, and is suitable for tuning of musical instruments. In the embodiment, the acceleration sensor 12 of the analog output type is used as an example.

The waveform shaping circuit 14 includes a band-pass filter (high-pass filter), an amplifier circuit, and the like, performs filtering on the output signals $S_x$, $S_y$, and $S_z$ of the acceleration sensor 12 with the high-pass filter for each output signal, and removes noise components (low-frequency components) included in each of the output signals $S_x$, $S_y$, and $S_z$. Moreover, the waveform shaping circuit 14 amplifies each output signal with the amplifier circuit to convert the output signal into a signal with a pulsed waveform, and outputs the output signals $S_x$, $S_y$, and $S_z$ after the conversion as output signals $T_x$, $T_y$, and $T_z$ to the arithmetic control unit 16.

The arithmetic control unit 16 performs various kinds of processing on the output signals $T_x$, $T_y$, and $T_z$ of the waveform shaping circuit 14 and outputs the output signals $T_x$, $T_y$, and $T_z$ to the operation device 50.

The arithmetic control unit 16 includes a central processing unit (CPU), memories (a random access memory (RAM), a read only memory (ROM), and a non-volatile memory), an A/D converter, other peripheral circuits, and the like. The memories store programs for causing the CPU to operate and various kinds of data. Each function of the arithmetic control unit 16 illustrated in FIG. 2 is implemented by the programs stored in the memories being executed by the CPU.

The arithmetic control unit 16 functions as a signal selection unit 22, a frequency detection unit 24, a storage unit 30, a transmission information generation unit 32, and a posture detection unit 34.

The signal selection unit 22 selects, as a signal for detection U, an output signal (the strongest signal) with a largest difference between a maximum value and a minimum value of the waveform amplitude from among the output signals $T_x$, $T_y$, and $T_z$ of the waveform shaping circuit 14 and outputs the selected signal for detection U to the frequency detection unit 24.

Note that although the influences on an attachment direction of the sensor device 10 and characteristics of the musical instrument MI are curbed by performing tuning using the strongest signal from among the output signals $T_x$, $T_y$, and $T_z$ in the embodiment, the present invention is not limited thereto. For example, it is also possible to use a synthesized value obtained by synthesizing (adding, for example) the output signals $T_x$, $T_y$, and $T_z$ of the XYZ axes as the signal for detection U while eliminating the necessity of the selection of an axis.

The frequency detection unit 24 detects the frequency of the signal for detection U, which is an output signal of the signal selection unit 22, and outputs the frequency that has been detected (hereinafter, referred to as a "detected frequency") F to the transmission information generation unit 32. Specifically, the frequency detection unit 24 obtains a cycle of a vibration by measuring a time between zero-cross points at which the plus or minus sign of the signal for detection U input from the signal selection unit 22 changes. Then, the frequency detection unit 24 obtains the detected frequency from the cycle of the vibration and outputs the detected frequency to the transmission information generation unit 32. The frequency detection unit 24 is an example of frequency detection means according to the present invention.

The transmission information generation unit 32 generates transmission information to be transmitted to the operation device 50 based on the detected frequency input from the frequency detection unit 24. Note that it is also possible to generate the transmission information based on the cycle of the vibration and to calculate the detected frequency on the side of the operation device 50 using information regarding the cycle of the vibration. The communication module 18 converts the transmission information into a signal for communication and transmits the signal for communication to the operation device 50. The transmission information generation unit 32 and the communication module 18 are examples of sensor-side communication means according to the present invention.

Then, the operation device 50 receives an operation input from the user via the operation unit 56 and receives a setting operation for setting a name of pitch (a number of a string, a name of a string in a case of a guitar, for example) that is a target of tuning as will be described later. The operation device 50 generates tuning information regarding the name of pitch that is the target of tuning using the transmission information transmitted from the sensor device 10 and causes the display unit 62 to display the tuning information. In this manner, the user can tune the musical instrument MI while viewing the tuning information displayed on the display unit 62.

Also, although the setting operation for the name of pitch that is the target of tuning is received via the operation unit 56 in the above example, it is also possible to receive the setting operation using the acceleration sensor 12 as input means.

Each of the output signals $S_x$, $S_y$, and $S_z$ of the acceleration sensor 12 includes an acceleration signal (acceleration of gravity) that changes depending on an inclination state (posture) of the sensor device 10 attached to the musical instrument as well as the vibration of the musical sound generated through the operation of the musical instrument. Thus, the posture detection unit 34 detects changes in the output signals $S_x$, $S_y$, and $S_z$ of the acceleration sensor 12 to detect posture information indicating the posture of the musical instrument. Note that the values of the acceleration of gravity detected by the acceleration sensor 12 may be output as direct current bias values.

The posture detection unit 34 detects the posture information indicating the posture (an inclination and an orientation) of the musical instrument with the sensor device 10 attached thereto, based on the output signals $S_x$, $S_y$, and $S_z$ of the acceleration sensor 12. The posture information detected by the posture detection unit 34 can be transmitted to the operation device 50 via the transmission information generation unit 32. The posture detection unit 34 is an example of posture detection means according to the present invention.

As will be described later, the operation device 50 stores a relationship between a change in acceleration and details of an operation, in a case in which the musical instrument MI is shaken up and down, or the like. Acquisition of the change in acceleration detected by the posture detection unit 34 in the sensor device 10 and detection of a motion of the musical instrument MI with the sensor device 10 attached thereto enable the operation device 50 to receive an operation input. Also, a combination of the posture of the sensor device 10 attached to the musical instrument MI and an operation performed on the musical instrument MI may enable an operation input. In a case in which the musical instrument MI is a guitar, for example, a combination of an orientation and an inclination angle of the guitar and an operation (vibration) performed on a specific string may enable an operation input.

Also, a behavior of the user may be detected in more detail to be able to be used for an operation input, by providing an angular speed sensor (gyro sensor) in addition to the acceleration sensor 12.

(Operation Device)

Next, the operation device will be described with reference to FIG. 3. FIG. 3 is a block diagram illustrating the operation device according to the first embodiment of the present invention.

As illustrated in FIG. 3, the operation device 50 according to the embodiment includes a control unit 52, a storage 54, an operation unit 56, a power source unit 58, a display control unit 60, a display unit 62, an audio output control unit 64, a speaker 66, a communication module 68, and an external connection interface (external connection I/F) 70. Although the operation device 50 may be a dedicated device, it is also possible to implement the operation device 50 by applying software or a program for implementing the functions according to the embodiment to a general-purpose device such as a smartphone, a tablet terminal, or a personal computer, for example.

The control unit 52 includes a CPU that controls operations of each part in the operation device 50 and a synchronous dynamic random access memory (SDRAM) used as a workspace for the CPU. The control unit 52 receives an operation input from the user via the operation unit 56, transmits a control signal in accordance with the operation input to each part of the operation device 50, and controls operations of each part. The control unit 52 functions as a tuning information generation unit 520, a musical performance support information generation unit 522, an operation distinguishing unit 524, a link state detection unit 526, a position information acquisition unit 528, and an alert output unit 530.

The storage 54 includes a non-volatile memory that stores programs executed by the CPU and data. As the non-volatile memory included in the storage 54, it is possible to use, for example, a storage device including a flash memory such as a solid state drive (SSD) or an embedded multi-media card (eMMC) or a storage device including a magnetic disk such as a hard disk drive (HDD). The storage 54 stores a table (A4=440 Hz, for example) indicating correspondences between names of pitches (scales) that are targets of tuning and frequencies (reference frequency $F_0$).

The operation unit 45 is means for receiving an operation input from the user. As the operation unit 56, it is possible to use a touch panel attached to a surface or the like of the display unit 62, a pointing device such as a mouse, and a keyboard, for example. The operation unit 56 is an example of operation means according to the present invention.

The power source unit 58 includes a primary cell or a secondary cell for supplying electric power to each part of the operation device 50. Note that the power source unit 58 may include a power source adaptor to convert a commercial power source into a state suitable for the operation device 50.

The display control unit 60 generates an image signal in accordance with a control signal from the control unit 52 and inputs the image signal to the display unit 62. The control unit 52 and the display control unit 60 are examples of control means according to the present invention.

The display unit 62 is an operation graphical user interface (GUI) and means for displaying an image (for example, a liquid crystal display) and displays an image in accordance with an image signal input from the display control unit 60. The display unit 62 is an example of display means according to the present invention.

The audio output control unit 64 generates a sound signal in accordance with a control signal from the control unit 52 and causes the speaker 66 to output sound. Note that in a case in which the musical instrument tuner 1 is used as a musical performance support device, an audio output function of the operation device 50 may be automatically invalidated by the control unit 52.

The communication module 68 is means for establishing communication connection to the sensor device 10. The communication module 68 converts a control signal output from the control unit 52 into a signal for communication and transmits the signal for communication to the sensor device 10. Also, the communication module 68 inputs data obtained by demodulating the signal received from the sensor device 10 to the control unit 52. The communication module 68 is an example of operation-side communication means according to the present invention.

The operation device 50 is communicably connected to external devices E1 and E2, such as effectors, via the external connection I/F 70. Note that although FIG. 3 illustrates, as examples, the external device E1 connected to the operation device 50 via the musical instrument MI and the external device E2 connected directly to the operation device 50, the connection methods of the external devices and the number of connected external devices are not limited thereto.

The external connection I/F 70 converts a control signal from the control unit 52 into a signal for communication and transmits the signal for communication to the external devices E1 and E2. In this manner, the user can perform setting for volume adjustment (amplification, attenuation, compression, and the like) using the effectors or the like via the operation device 50. Also, the external connection I/F 70 may demodulate information regarding setting received from the external devices E1 and E2 and input the demodulated information to the control unit 52. Here, a communication scheme between the operation device 50 and the external devices E1 and E2 may be either a wired communication scheme or a wireless communication scheme.

(Tuning Mode)

Figure 4:
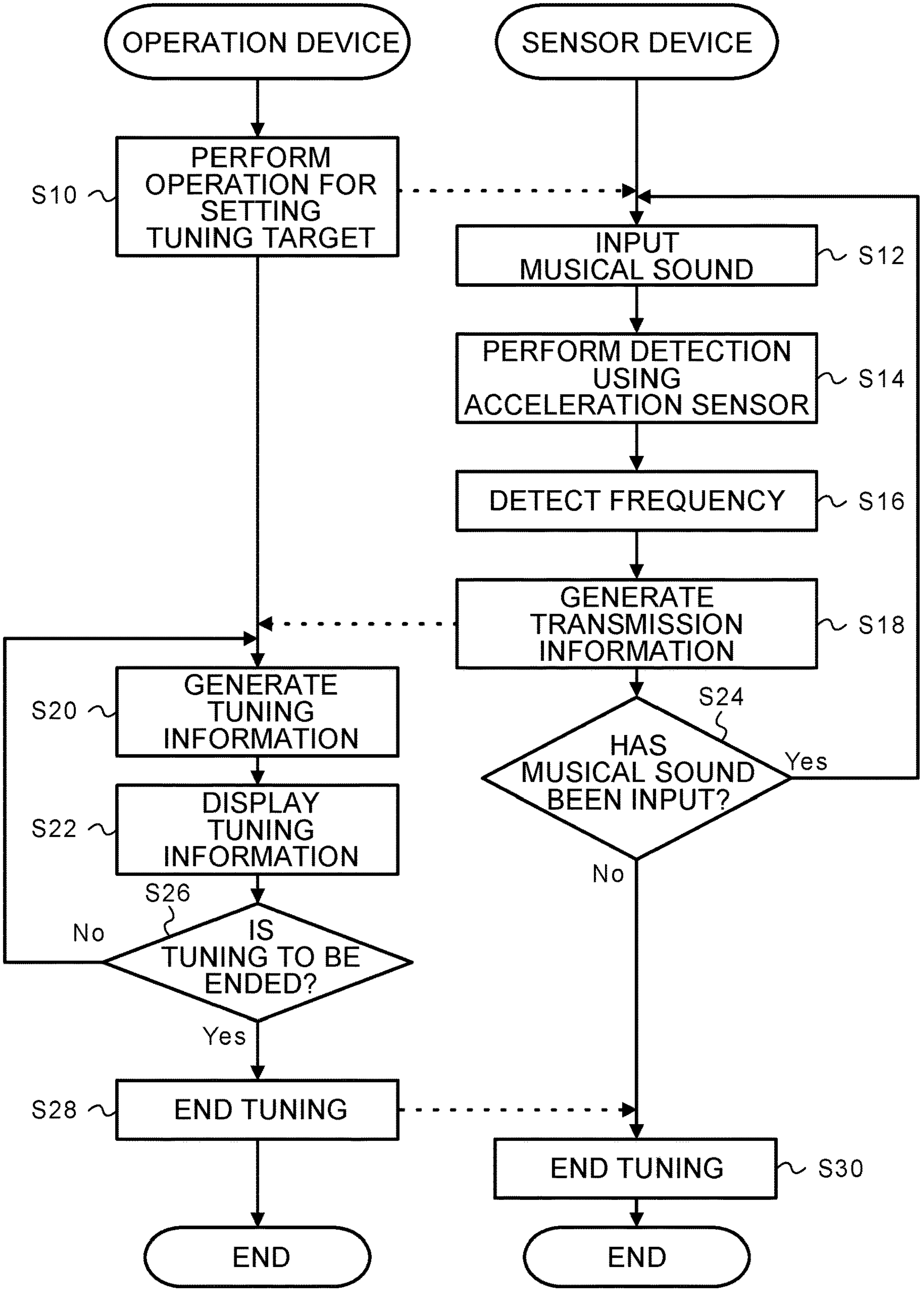
FIG. 4 is a flowchart illustrating a tuning method using the musical instrument tuner according to the first embodiment of the present invention.

Next, a flow of processing in a case in which the musical instrument MI is tuned will be described with reference to FIG. 4. FIG. 4 is a flowchart illustrating a tuning method using the musical instrument tuner according to the first embodiment of the present invention.

First, in a case in which tuning is started with the sensor device 10 of the musical instrument tuner 1 attached to the musical instrument MI, the operation device 50 and the sensor device 10 are set in a tuning mode for tuning the musical instrument MI in response to an operation input from the operation device 50 or the sensor device 10. The operation device 50 receives an operation input from the user and performs a setting operation for a target of tuning (Step S10). In a case in which the musical instrument MI is a guitar, the target of tuning is not limited to a name of pitch corresponding to each of a plurality of strings, and a number of string or a name of a string may be set. If the setting operation for the target of tuning is performed, then an operation signal corresponding to the setting operation is transmitted from the operation device 50 to the sensor device 10.

Next, musical sound generated through an operation performed by the user on the musical instrument MI is input to the sensor device 10 (Step S12). At this time, the acceleration sensor 12 included in the sensor device 10 detects a vibration of the musical sound input to the sensor device 10 (Step S14).

Output signals $S_x$, $S_y$, and $S_z$ of the acceleration sensor 12 are input to the signal selection unit 22 via the waveform shaping circuit 14, and an output signal with the largest difference between a maximum value and a minimum value of a waveform amplitude is selected as a signal for detection U. Then, the frequency detection unit 24 detects the frequency of the selected signal for detection U as a detected frequency F (Step S16).

Next, the transmission information generation unit 32 generates transmission information based on the detected frequency input from the frequency detection unit 24. Then, the transmission information is transmitted from the sensor device 10 to the operation device 50 (Step S18).

Next, the communication module 68 in the operation device 50 demodulates the transmission information received from the sensor device 10 and inputs the transmission information to the control unit 52. Then, the control unit 52 (tuning information generation unit 520) generates tuning information for supporting user's tuning based on the transmission information (Step S20).

Specifically, the control unit 52 (tuning information generation unit 520) acquires, from the transmission information, the detected frequency F corresponding to an operation of the musical instrument MI with the sensor device 10 attached thereto and determines a note and a pitch based on the detected frequency F.

Also, the control unit 52 (tuning information generation unit 520) reads, from the storage 54, the reference frequency $F_0$ corresponding to the name of pitch set as a target of tuning in Step S10 and detects a deviation between the detected frequency F and the reference frequency $F_0$ (hereinafter, referred to as a "frequency deviation") ΔF. Here, the tuning information generation unit 520 is an example of frequency deviation detection means according to the present invention.

Next, the control unit 52 (tuning information generation unit 520) outputs the generated tuning information to the display control unit 60. The display control unit 60 causes the display unit 62 to display the name of pitch (or the number of the string, the name of the string, or the like) that is a target of tuning, the note, the pitch, the frequency deviation ΔF from the reference frequency $F_0$ determined from the name of pitch, and the like as the tuning information of the musical instrument MI (Step S22). Also, the display unit 62 is caused to display an indication (in the case of a guitar, for example, an indication regarding which peg is to be fastened or loosened) for a specific operation to be performed on the musical instrument MI. In this manner, the user can tune the musical instrument MI with reference to the tuning information displayed on the display unit 62. Note that the information displayed on the display unit 62 is not limited to the tuning information and may include other kinds of tuning information.

Next, in a case in which the tuning is continued, musical sound generated through an operation performed by the user on the musical instrument MI is input again (Yes in Step S24). Then, Steps S12 to S22 are repeated, and the tuning information is displayed on the display unit 62 (Step S22).

If the tuning is ended for all the musical sounds and the like (strings of the guitar, for example) that are targets of tuning, and a command for ending the tuning is input from the operation unit 56 in the operation device 50 (Yes in Step S26), then the tuning mode in the operation device 50 is ended (Step S28). Then, the command for ending the tuning is transmitted from the operation device 50 to the sensor device 10, and the tuning mode is also ended in the sensor device 10 (Step S30).

In this manner, according to the embodiment, a vibration of musical sound generated through an operation of the musical instrument is detected by the acceleration sensor 12. Since the acceleration sensor 12 is configured with a three-axes acceleration sensor having three detection axes that orthogonally intersect each other, it is possible to detect a frequency (detected frequency F) of the vibration of the musical sound generated through the operation of the musical instrument using an output signal from the detection axis with the largest signal intensity from among output signals of the three detection axes. In this manner, it is possible to appropriately capture the vibration of the musical sound generated from the musical instrument without being affected by the attachment position and the orientation of the sensor device 10 relative to the musical instrument. It is thus possible to provide satisfactory usability and to perform stable and accurate tuning.

Note that although the acceleration sensor 12 is configured with the three-axes acceleration sensor as an example of a preferable aspect in the embodiment, the acceleration sensor 12 is not limited thereto and may be configured with a two-axis acceleration sensor having two detection axes that orthogonally intersect each other. Even in this case, it is possible to provide satisfactory usability and to perform stable and accurate tuning as compared with the tuner in the related art that includes a vibration sensor with sensitivity only in one-axis direction.

Also, although the setting and the ending of the tuning mode are performed by the operation unit 56 in the operation device 50 in the embodiment, commands to set and end the tuning mode may be provided by detecting changes in acceleration associated with details of operations, using the acceleration sensor 12 in the sensor device 10. Also, commands to set and end the tuning mode may be individually provided to the sensor device 10 and the operation device 50.

Also, as data to be transmitted from the sensor device 10 to the operation device 50, transmission of ID information of the sensor device 10, a value of each axis of the acceleration sensor 12, and cycle value of an arbitrary axis of the acceleration sensor 12, for example, is also conceivable. However, when the amount of data transmitted from the sensor device 10 to the operation device 50 increases, power consumption of the sensor device 10 increases, and an operating time of the sensor device 10 with the battery decreases. Therefore, it is preferable that the type of data to be transmitted be able to be selected by the operation device 50 to select a necessary minimum amount of data. In the embodiment, the sensor device 10 calculates the detected frequency F and the frequency deviation ΔF from the strongest signal from among the values of the three axes of the acceleration sensor 12 or a synthesized value of the values from the axes and transmits the frequency deviation ΔF to the operation device 50. In this manner, it is possible to curb the amount of data to be transmitted between the sensor device 10 and the operation device 50 in the tuning mode and to extend the lifetime of the battery of each power source unit.

(Musical Performance Support Mode)

Incidentally, in a case in which the musical instrument MI is played, objective analysis of a musical performance state is required, and easy control of an external device, such as an effector, for adjusting acoustic effects of the musical instrument MI is required, for example.

Figure 5:
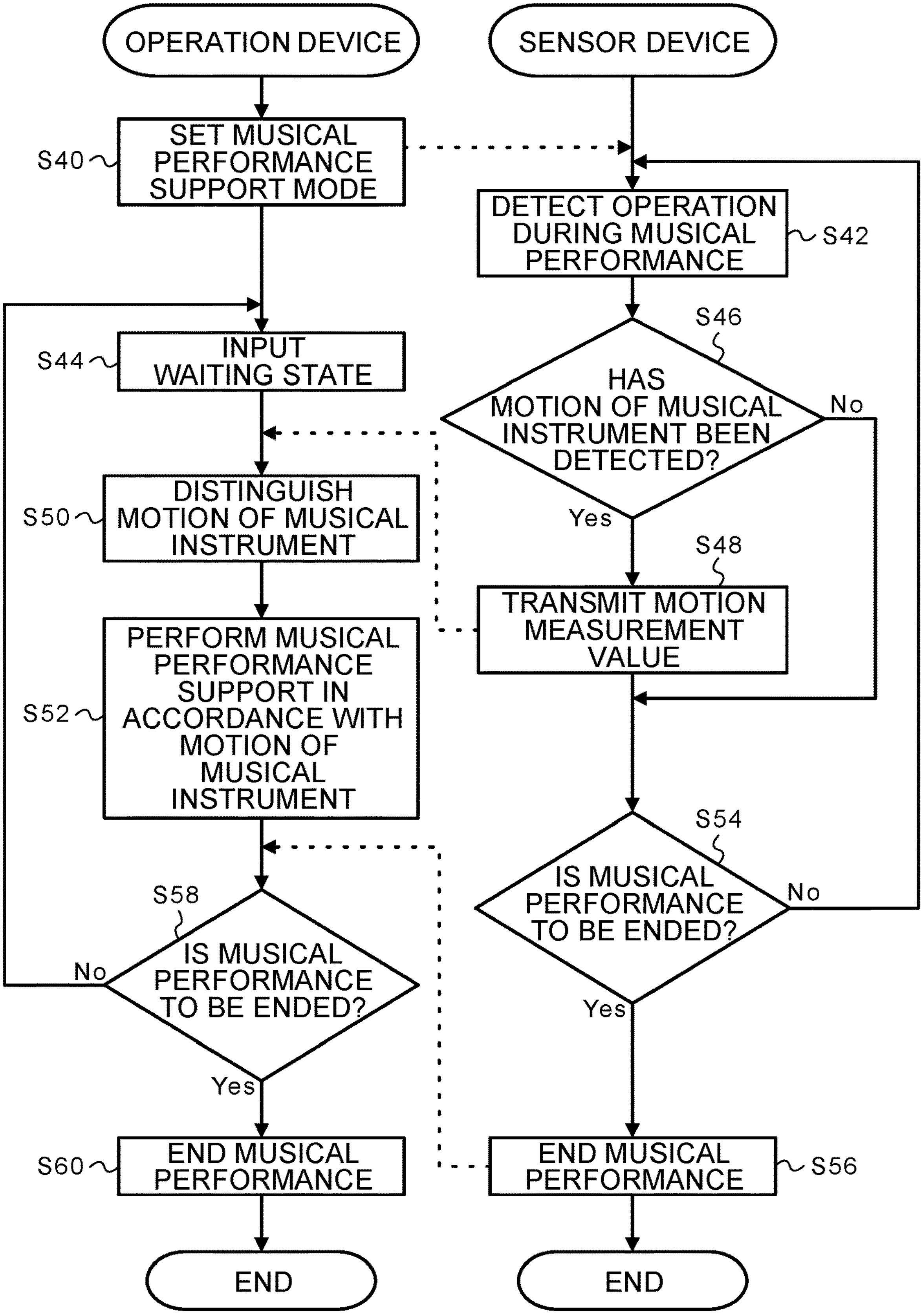
FIG. 5 is a flowchart illustrating a musical performance support method according to the first embodiment of the present invention.

The musical instrument tuner 1 according to the embodiment can be applied to musical performance support as described above using a detection signal of the acceleration sensor 12. FIG. 5 is a flowchart illustrating a musical performance support method according to the first embodiment of the present invention.

First, if a musical performance support mode is set in the operation device 50 (Step S40), then a command to set the musical performance support mode is transmitted to the sensor device 10. The arithmetic control unit 16 in the sensor device 10 receives the command to set the musical performance support mode and then starts operation detection during musical performance (Step S42). On the other hand, the operation device 50 is brought into a state in which the operation device 50 waits for an input of an operation of the musical instrument MI from the sensor device 10 (Step S44).

Next, if a motion of the musical instrument MI is detected by the acceleration sensor 12 in the sensor device 10 (Yes in Step S46), then the transmission information generation unit 32 generates transmission information including a motion measurement value including information regarding acceleration for each of the XYZ axes and a temporal change thereof. The communication module 18 transmits the transmission information to the operation device 50 (Step S48). Here, the detection signal of the acceleration sensor 12 may be used as it is as the motion measurement value.

Next, the control unit 52 (operation distinguishing unit 524) in the operation device 50 analyzes the motion measurement value received from the sensor device 10 and distinguishes the motion of the musical instrument MI (Step S50). The control unit 52 (musical performance support information generation unit 522) generates musical performance support information to assist musical performance of the user in accordance with the motion of the musical instrument MI. Then, the control unit 52 (musical performance support information generation unit 522) controls the display control unit 60, controls display on the display unit 62, and performs musical performance support for the user based on the musical performance support information (Step S52).

Here, (1) to (3) listed below are conceivable as aspects of musical performance assistance for the user.

(1) Detection of Musical Performance State

Analysis of a musical performance state based on a signal output from the acceleration sensor 12 in the sensor device 10 and generation of musical performance support information performed by the control unit 52 (the musical performance support information generation unit 522 and the operation distinguishing unit 524) are conceivable. For example, the arithmetic control unit 16 in the sensor device 10 calculates an optimal value from a value (the strongest signal, for example) of an axis of the acceleration sensor 12 that expresses the musical performance state of the musical instrument MI the best or a synthesized value of values from the axes and transmits data of the optimal value to the operation device 50. Here, in a case in which there is a margin in a transmission band between the sensor device 10 and the operation device 50, data of all the three XYZ axes may be transmitted from the sensor device 10 to the operation device 50, and the optimal value may be calculated on the side of the operation device 50.

Next, the control unit 52 in the operation device 50 performs fast Fourier transform (FFT) analysis or the like using the optimal value or the data of all the three axes and calculates musical intervals, states of chords, tempos, and the like of the musical performance. The control unit 52 outputs these calculated values to the display control unit 60 and causes the display unit 62 to display the calculated values. In this manner, the user can play or practice the musical instrument with reference to the calculated values displayed on the display unit 62 of the operation device 50.

In the example (1), the control unit 52 may evaluate the musical performance state by reading a musical score of the music that is being played and comparing the musical intervals and the like read from the musical score with the aforementioned calculated values, for example, and cause the display unit 62 to display the result of evaluating the musical performance state (a score indicating the evaluation of the musical performance state, a message like "the tempo is too fast", and the like).

(2) Cooperation with External Devices (E1 and E2) Such as Effectors (Motion Detection)

In a case in which cooperation with the external devices (E1 and E2) is performed, the control unit 52 stores correspondences between motions of the musical instrument MI (motions) and details of commands provided to the external devices (E1 and E2) such as effectors in advance. Then, the control unit 52 detects an operation performed on the musical instrument MI based on a signal indicating a magnitude and an orientation of acceleration transmitted from the sensor device 10 and transmits a command to change setting to the external devices (E1 and E2). It is possible to associate operations performed on the musical instrument MI with details of commands, and for example, the volume is turned up in a case in which the musical instrument MI is lifted quickly (the acceleration in the vertically upward direction is equal to or greater than a threshold value), or the width of a change in volume is enlarged or compressed in a case in which a guitar head is shaken (a case in which acceleration or an angular speed relative to a certain axis periodically changes). It is thus possible for the user to easily provide a command to the external devices (E1 and E2) such as effectors during musical performance.

Note that the details of the command output to the external devices (E1 and E2) (for example, "the volume was turned up" or "the width of a change in volume was enlarged") may be displayed on the display unit 62 of the operation device 50 such that the user can check whether the command intended by the user has been provided.

(3) Display of Musical Score and the Like in Operation Device 50 (Motion Detection)

Figure 6:
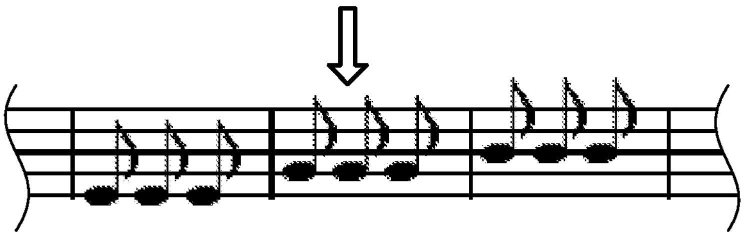
FIG. 6 is a diagram illustrating an example of display indicating a musical performance progress state.

The control unit 52 may cause the display unit 62 to display the musical score that is being played in the musical performance support mode. In this case, it is possible to use, as a musical score data format, Portable Document Format (PDF), PostScript, Encapsulated PostScript (EPS), electronic Publication (ePub), Music eXtensible Markup Language (XML), or the like, or an arbitrary format such as a format unique to musical score creation software, for example. Such data of the musical sore may be stored in the storage 54 in advance or may be able to be acquired via the Internet or the like (see the second embodiment). (3-1) The control unit 52 detects a progress state of the musical performance in accordance with the measurement value of the motion of the musical instrument MI, causes an image of an arrow or the like indicating a part that is being plated to be displayed in a superimposed manner on the musical score as illustrated in FIG. 6, and causes the image to move in accordance with the progress state of the musical performance. (3-2) Also, the control unit 52 may turn up a page of the musical score in accordance with the progress state of the musical performance or may return a page of the musical score in accordance with a motion of the musical instrument MI. (3-3) Moreover, the control unit 52 may increase or decrease the number of pages of the musical score to be displayed on one screen in accordance with a musical performance speed (for example, the number of pages may be increased as the musical performance speed increases).

Here, in the case in which the command for the external devices (E1 and E2) in (2) or the command to change the display of the musical score and the like in the operation device 50 in (3) is provided, the motion detection may be performed by any of the sensor device 10 and the operation device 50. In order for the operation device 50 to precisely perform the motion detection, data of the three axes of the acceleration sensor 12 and data of the three axes of the angular speed sensor are preferably transmitted to the operation device 50. A motion that the user applies to the musical instrument MI is significantly slower (the frequency is smaller) than the vibration caused by the musical performance of the musical instrument MI (vibration of strings, for example). Thus, it is possible to reduce the amount of information to be transmitted by lowering a sampling frequency at the acceleration sensor 12 and the angular speed sensor (about 100 Hz, for example). In addition, it is also possible to reduce the quantization bit number of the signal for the motion detection, such as from 12 bits to 8 bits.

Also, the musical performance support in (1) and the motion detection in (2) and (3) can be realized at the same time if there is a margin in the transmission band between the sensor device 10 and the operation device 50. This is because it is possible to transmit as much data obtained from the acceleration sensor 12 and the angular speed sensor as possible to the operation device 50 and to break down and use the information on the side of the operation device 50.

In a case in which data of a total of six axes, namely the data of the three axes of the acceleration sensor 12 and the data of the three axes of the angular speed sensor is transmitted at a sampling rate of 4 kHz and using 12 bits, for example, it is possible to acquire the data of all the six axes at a proportion of once in twenty times for the motion detection and to set the apparent sampling rate to about 200 Hz, or it is possible to extract and employ only data of effective 8 bits from the data of 12 bits. At this time, it is also possible to obtain an addition average of data obtained twenty times. Moreover, it is also possible to directly analyze only data of necessary axes at the same time with the motion detection from among the data of the axes output from the acceleration sensor 12. In this case, if a motion is a linear motion, for example, absolute values of data of the three axes of the acceleration sensor 12 may be compared, and only data of an axis with the maximum absolute value may be set as a target of the analysis. Also, in a case in which a motion is a planar motion, only data of two axes except for data with the minimum absolute value may be set as targets of analysis.

Next, if a state in which no motion is detected by the acceleration sensor 12 continues for a predetermined time in the sensor device 10, the arithmetic control unit 16 determines that the musical performance has ended (Yes in Step S54) and cause the musical performance support mode to end (Step S56). Further, the arithmetic control unit 16 transmits a command to end the musical performance support mode to the operation device 50 and cause the operation device 50 to end the musical performance support mode (Yes in Step S58 and S60).

According to the embodiment, it is possible to facilitate musical performance of the user by determining the progress state of the musical performance using the acceleration sensor 12 of the musical instrument tuner 1 and controlling the display of the musical score.

Note that although the command to set the musical performance support mode is provided from the operation device 50 to the sensor device 10 while the command to end the musical performance support mode is provided based on the sensor device 10 determining the end of the musical performance in the embodiment, the present invention is not limited thereto. The command to set the musical performance support mode may be provided from the sensor device 10 to the operation device 50, the command to end the musical performance support mode may be provided from the operation device 50, or operations to set and end the musical performance support mode may be individually input to the sensor device 10 and the operation device 50.

(Musical Instrument Management Mode)

Figure 7:
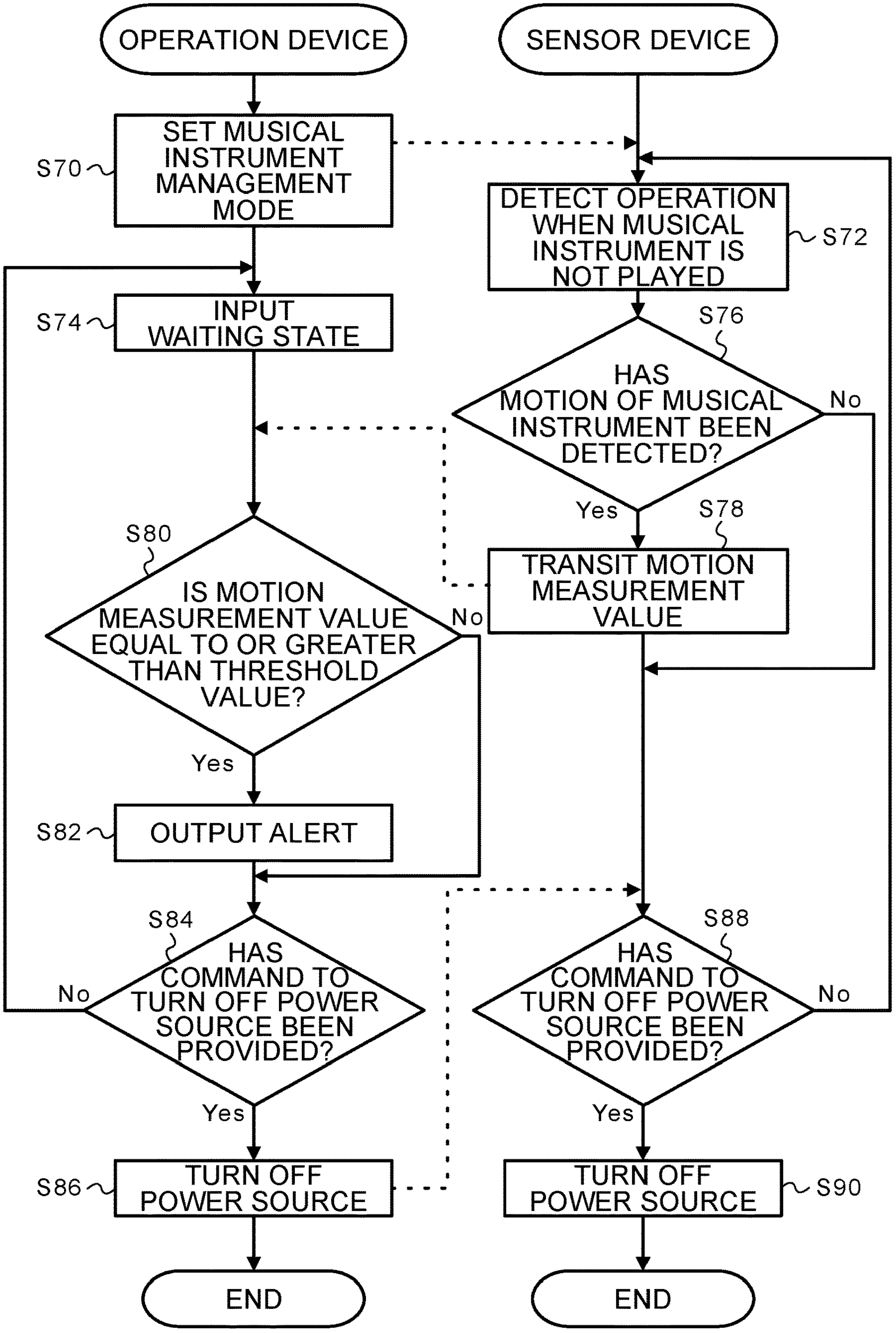
FIG. 7 is a flowchart illustrating a musical instrument management method according to the first embodiment of the present invention.

Incidentally, the musical instrument MI may fall down or may be erroneously moved by a person other than the user when the musical instrument MI is not used, that is, the musical instrument MI is not played. The musical instrument tuner 1 according to the embodiment can also perform management (motion detection when not used) of the musical instrument MI using the acceleration sensor 12 and a communication function. FIG. 7 is a flowchart illustrating a musical instrument management method according to the first embodiment of the present invention.

First, if a musical instrument management mode is set in the operation device 50 (Step S70), a command to set the musical instrument management mode is transmitted to the sensor device 10. If the command to set the musical instrument management mode is received, then the arithmetic control unit 16 of the sensor device 10 starts operation detection when the musical instrument is not played (when the musical instrument is not used, for example, when the musical instrument is kept, or during breaktime) (Step S72). On the other hand, the operation device 50 is brought into a state in which the operation device 50 waits for an input of an operation of the musical instrument MI from the sensor device 10 (Step S74).

Note that the musical instrument management mode may be automatically set in a case in which storage of the musical instrument MI with the sensor device 10 attached thereto in a case is detected, for example. In this case, the musical instrument management mode may be automatically set <1> in a case in which stopping of the musical instrument MI for a specific period of time is detected by the sensor device 10 or <2> in a case in which the sensor device 10 detects a sensor for near-field communication such as a sensor (for example, a radio frequency identifier (RFID)) incorporated in a case of the musical instrument MI, for example. Alternatively, an optical sensor (for example, a photodiode or a solar battery) may be provided in the sensor device 10, and the musical instrument management mode may be automatically set on the assumption that the musical instrument MI with the sensor device 10 attached thereto has been accommodated in the case <3> in a case in which a detection output from the optical sensor has dropped to a value that is equal to or less than a predetermined value or a state in which the detection output is equal to or less than the predetermined value has continued for a predetermined time. Alternatively, a magnet may be provided in the case in which the musical instrument MI is accommodated, a Hall sensor may be attached to the sensor device 10, and the musical instrument management mode may be automatically set <4> in a case in which the Hall sensor detects the magnet in the case.

Next, if the acceleration sensor 12 of the sensor device 10 detects a motion of the musical instrument MI (Yes in Step S76), then the transmission information generation unit 32 generates transmission information including a measurement value of the motion including information regarding acceleration for each of the XYZ axes and a temporal change thereof. The communication module 18 transmits the transmission information to the operation device 50 (Step S78).

Next, the control unit 52 (operation distinguishing unit 524) in the operation device 50 analyzes the measurement value of the motion received from the sensor device 10 and distinguishes the motion of the musical instrument (Step S80). Then, in a case in which the measurement value of the motion is equal to or greater than a threshold value (Yes in Step S80), the control unit 52 (alert output unit 530) outputs a control signal for a command to output an alert to the display control unit 60 and the audio output control unit 64, performs alert display on the display unit 62 and an output of alert sound from the speaker 66 (Step S82), and returns to Step S74. In Steps S80 to S82, it is possible to notify the user of falling-down or movement of the musical instrument MI by causing an alert to be output in a case in which the movement of the musical instrument MI with the sensor device 10 attached thereto is detected in a situation in which the musical instrument MI is kept, for example. It is thus possible to prevent the musical instrument MI from being lost or stolen.

Next, in a case in which the musical instrument management mode is ended, and the power source is turned off, a command to turn off the power source is input from the operation unit 56 of the operation device 50 (Yes in Step S84), and the power source of the operation device 50 is turned off (Step S86). Then, a command to turn off the power source is transmitted from the operation device 50 to the sensor device 10 (Yes in Step S88), and the power source of the sensor device 10 is turned off (Step S90).

According to the embodiment, it is possible to notify the user of falling-down or movement of the musical instrument MI by detecting a motion of the musical instrument MI when the musical instrument is not played, using the acceleration sensor 12 of the musical instrument tuner 1. It is thus possible to prevent the musical instrument MI from being lost or stolen.

Figure 8:
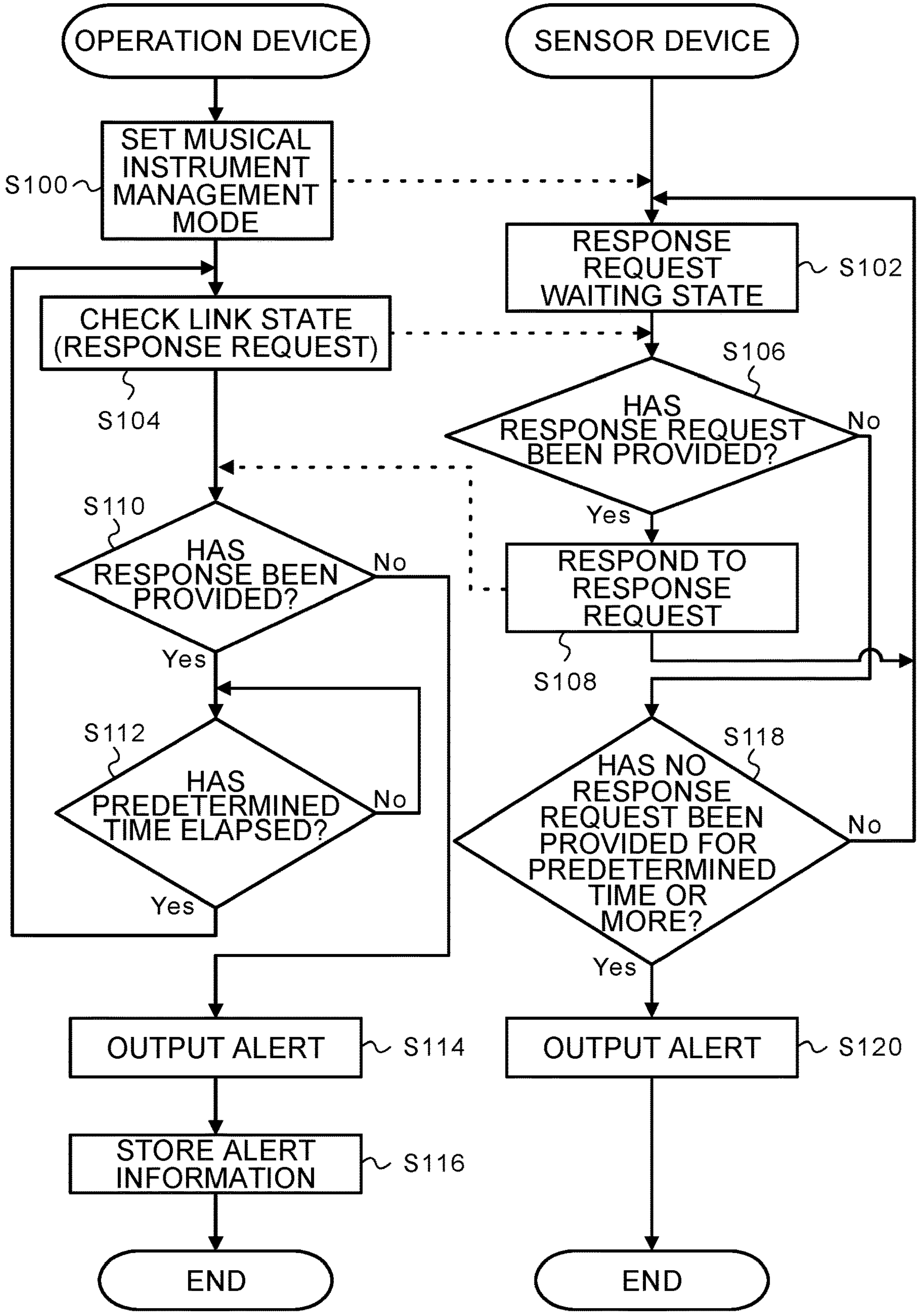
FIG. 8 is a flowchart illustrating another example of the musical instrument management method according to the first embodiment of the present invention.

Moreover, it is also possible to use the communication function of the musical instrument tuner 1 according to the embodiment to manage the musical instrument MI (to prevent the musical instrument MI from being lost or stolen). FIG. 8 is a flowchart illustrating another example of the musical instrument management method according to the first embodiment of the present invention.

First, if the musical instrument management mode is set in the operation device 50 (Step S100), then a command to set the musical instrument management mode is transmitted to the sensor device 10. If the command to set the musical instrument management mode is received, then the arithmetic control unit 16 of the sensor device 10 starts to monitor a link state (whether or not a state in which communication is available has been obtained) and is brought into a state in which the arithmetic control unit 16 waits for a response request (Steps S102 to S118).

The control unit 52 (link state detection unit 526) of the operation device 50 transmits a response request signal for requesting a response to the sensor device 10 at every predetermined time (at every 1 second to several seconds, for example) (Step S104). In a case in which a link state between the sensor device 10 and the operation device 50 is maintained, the response request signal reaches the sensor device 10, and a response signal in response to the response request signal is transmitted from the sensor device 10 to the operation device 50 (Yes in Step S106 and Step S108). Here, the response request signal and the response signal may include identification (ID) information for identifying the operation device 50 and the sensor device 10, respectively. The control unit 52 determines whether or not the link state with the sensor device 10 has continued, by receiving the response signal from the sensor device 10 (Step S110). It is possible to continuously monitor the link state by repeating the processing in Steps S102 to S112 at every predetermined time.

In a case in which the musical instrument MI with the sensor device 10 attached thereto is left, for example, the distance between the sensor device 10 and the operation device 50 increases, and communication connection is cut. In this case, the operation device 50 does not receive a response signal because the response request signal or the response signal does not arrive (No in Step S110). In this case, the control unit 52 (alert output unit 530) outputs a control signal for a command to output an alert to the display control unit 60 and the audio output control unit 64 and performs alert display on the display unit 62 and an output of alert sound from the speaker 66 (Step S114). In Step S114, the alert is output at a timing at which the cutting of the communication connection between the sensor device 10 and the operation device 50 is detected (at the timing of cutting of the link), and it is thus possible to prevent the musical instrument MI from being lost and stolen due to the leaving of the musical instrument MI. Here, the alert output unit 530, the display unit 62, and the speaker 66 are examples of alert output means according to the present invention.

Also, the control unit 52 (position information acquisition unit 528) acquires position information indicating the current position of the operation device 50 and stores, in the storage 54, the position information and alert information including information regarding the date and the time when the cutting of the link is detected (Step S116). The position information may be acquired from access point information of wireless LAN connection of the operation device 50, or in a case in which the operation device 50 has a global positioning system (GPS) function, GPS information may be acquired, for example. Here, the storage 54 functions as position information storage means according to the present invention. In this manner, the user can estimate the place where the user has left the musical instrument MI with the sensor device 10 attached thereto, with reference to the position information of the operation device 50 at the timing of the cutting of the link.

On the other hand, in a case in which the response request signal from the operation device 50 has not been received by the sensor device 10 for a predetermined time (several minutes, for example) or more (Yes in Step S118), alert sound is output using an LED, a speaker, or the like, which is not illustrated (Step S120). It is thus possible to reliably prevent the operation device 50 and the musical instrument MI from being left.

According to the embodiment, it is possible to perform management of the musical instrument to prevent the musical instrument from being lost and stolen, using the communication function of the musical instrument tuner 1.

Note that in the embodiment, the response request signal may include the position information indicating the current position of the operation device 50, and the position information included in the response request signal received immediately before the cutting of the link (Yes in Step S118)

may be stored as the alert information in the storage unit 30. This enables the user to refer to the position information immediately before the cutting of the link, and it is thus possible to specify the place where the operation device 50 has been left after leaving the operation device 50.

Also, in a case in which the sensor device 10 has the GPS function, the sensor device 10 may store the position information at the timing of the cutting of the link (Yes in Step S118) as the alert information in the storage unit 30. Also, in this case, the response signal transmitted from the sensor device 10 to the operation device 50 may include the position information of the sensor device 10, and the operation device 50 may store the position information included in the response signal received immediately before the cutting of the link (No in Step S110) as the alert information in the storage 54. This enables the user to view the position information of the sensor device 10 immediately before the cutting of the link through the operation device 50, it is thus possible to specify the place where the musical instrument MI with the sensor device 10 attached thereto has been left after leaving the musical instrument MI.

Also, after the cutting of the link is detected, and the output of the alert and the storage of the alert information are executed, the power sources of the sensor device 10 and the operation device 50 may be turned off, or the link state may be continuously detected. In a case in which the link state is continuously detected, the output of the alert may be stopped, or the alert information stored in the storage unit 30 or the storage 54 may be deleted when the link state is recovered (in a case of a temporary radio interference or cutting of the link).

Also, although the command to set the musical instrument management mode and the command to end the musical instrument management mode (a command to turn off the power source) are provided from the operation device 50 to the sensor device 10 in the examples illustrated in FIGS. 7 and 8, the present invention is not limited thereto. The commands to set and end the musical instrument management mode may be provided from the sensor device 10 to the operation device 50, or operations to set and end the musical instrument management mode may be individually input to the sensor device 10 and the operation device 50.

Note that the sensor device 10 is preferably assembled with a part of a component of the musical instrument MI, for example, a head portion in a case of a guitar, such that the sensor device 10 cannot be disassembled. It is thus possible to more reliably prevent the musical instrument MI from being lost and stolen.

Also, even if the sensor device 10 can be easily attached to and detached from the musical instrument MI (a clip scheme, for example), it is possible to prevent the musical instrument MI from being lost and stolen by accommodating the sensor device 10 in a musical instrument case or the like for the musical instrument MI.

Second Embodiment

Next, a second embodiment of the present invention will be described. Note that in the following description, the same reference signs will be applied to configurations that are similar to those in the first embodiment, and description thereof will be omitted.

Figure 9:
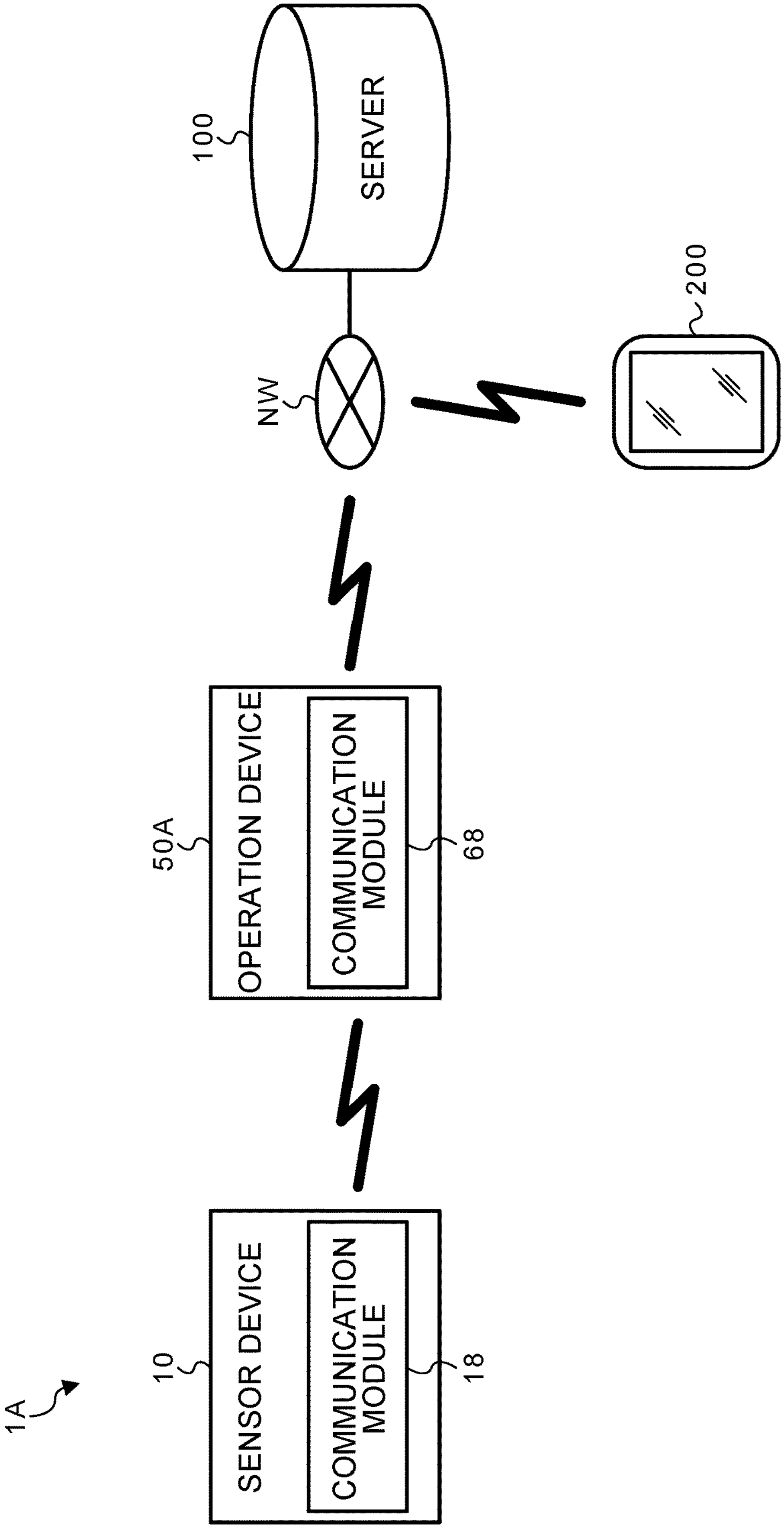
FIG. 9 is a block diagram illustrating a musical instrument tuner according to a second embodiment of the present invention.
Figure 10:
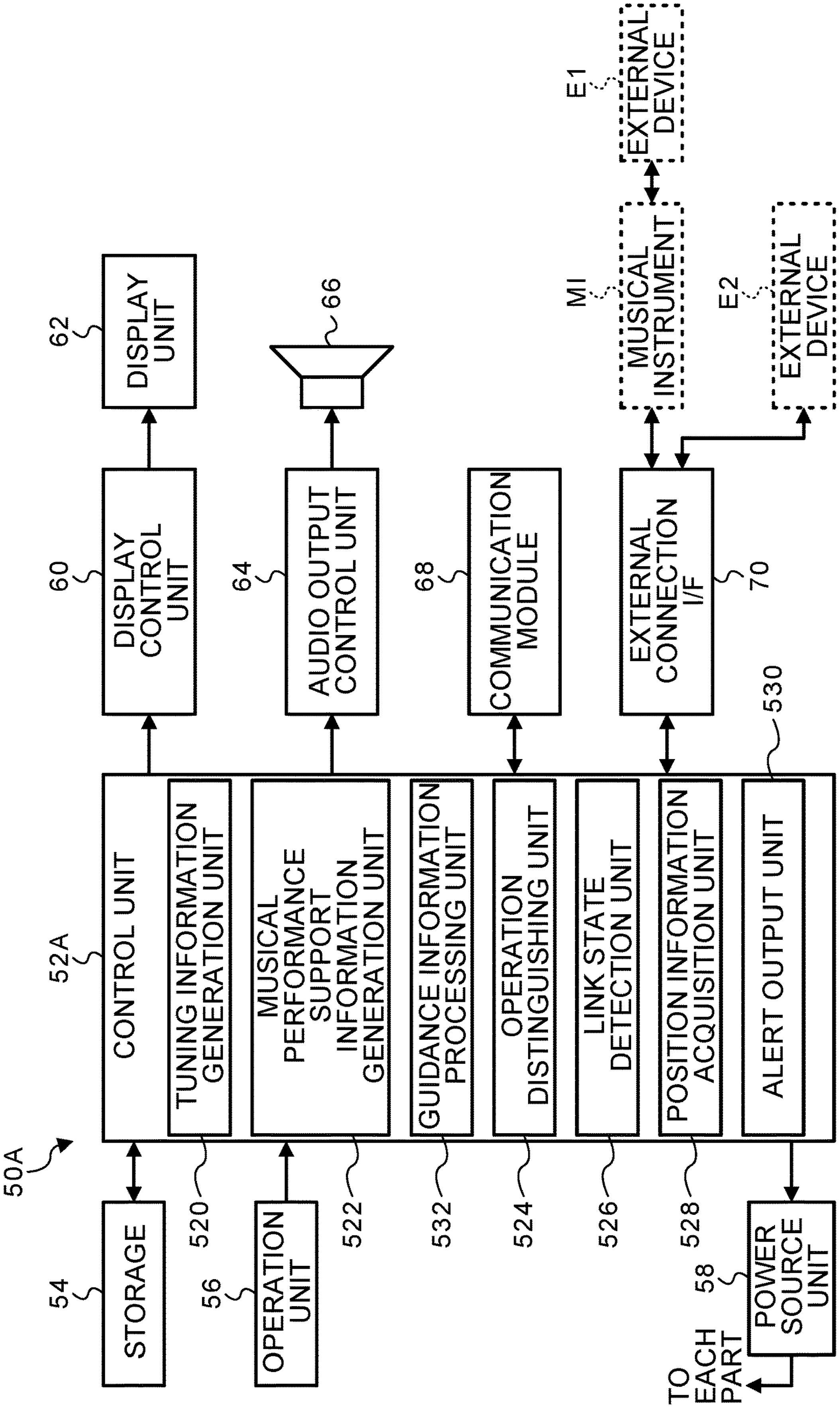
FIG. 10 is a block diagram illustrating an operation device according to the second embodiment of the present invention.

FIG. 9 is a block diagram illustrating a musical instrument tuner according to the second embodiment of the present invention, and FIG. 10 is a block diagram illustrating an operation device according to the second embodiment of the present invention.

As illustrated in FIG. 9, a musical instrument tuner 1A according to the embodiment is communicably connected between a server 100 and an instructor terminal 200 through a network NW (for example, the Internet or a virtual private network (VPN)). Here, the instructor terminal 200 is, for example, a tablet terminal, a personal computer, or a work station. In the embodiment, it is possible to receive guidance in regard to a practice for musical performance from a music instructor (hereinafter, referred to as an instructor) via the server 100. Moreover, it is possible to perform management of the musical instrument MI using the server 100 in the embodiment.

Figure 11:
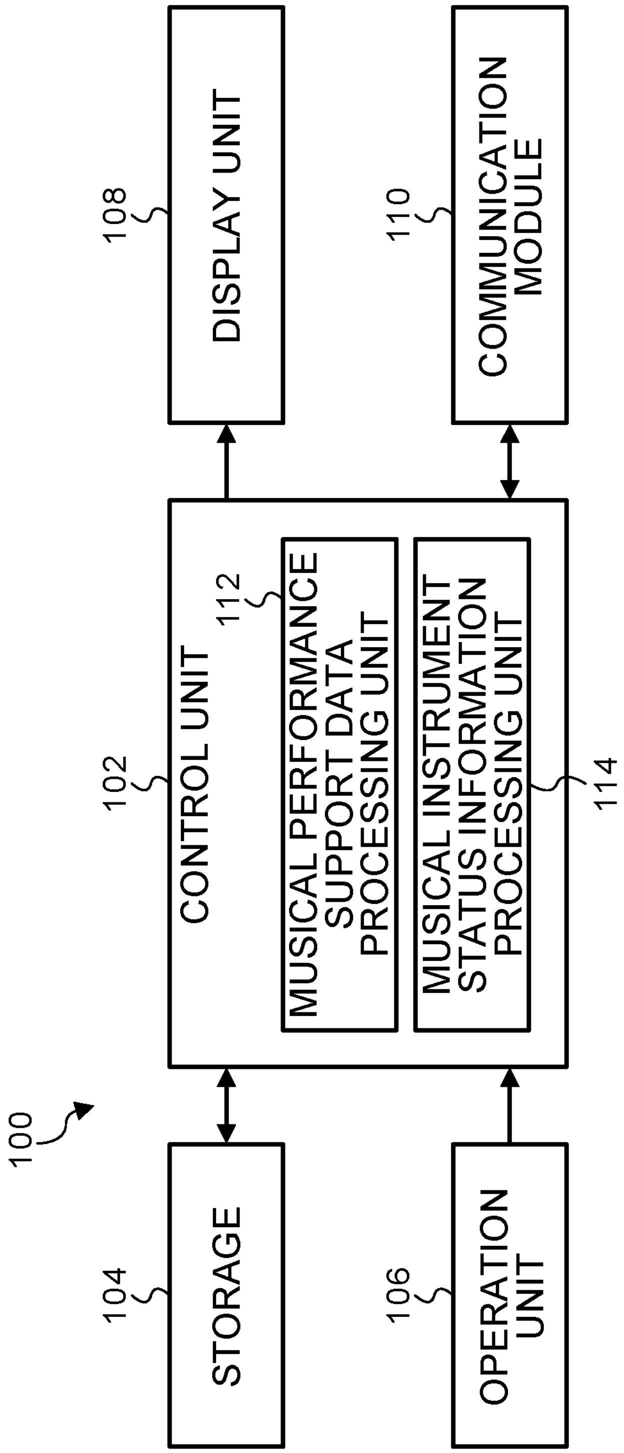
FIG. 11 is a block diagram illustrating a server according to the second embodiment of the present invention.

FIG. 11 is a block diagram illustrating the server according to the second embodiment of the present invention. As illustrated in FIG. 11, the server 100 according to the embodiment includes a control unit 102, a storage 104, an operation unit 106, a display unit 108, and a communication module 110.

The control unit 102 includes a CPU that controls operations of each part of the server 100 and an SDRAM used as a workspace of the CPU. The control unit 102 receives operation inputs from the user via the operation unit 106, transmits control signals in accordance with the operation inputs to each part of the server 100, and controls operations of each part. The control unit 102 functions as a musical performance support data processing unit 112 and a musical instrument status information processing unit 114, which will be described later.

The storage 104 includes a non-volatile memory that stores programs and data executed by the CPU. As the non-volatile memory included in the storage 104, it is possible to use, for example, a storage device including a flash memory such as an SSD or an eMMC, a storage device including a magnetic disk such as an HDD, or the like. The storage 104 stores a database, which will be described later (see FIGS. 12 and 14).

The operation unit 106 is means for receiving operation inputs from the user and includes, for example, a pointing device, such as a mouse, and a keyboard.

The display unit 108 is an operation GUI for the server 100 and means for displaying images (for example, a liquid crystal display) and displays images in accordance with image signals input from the control unit 102.

The communication module 110 is means for establishing communication connection with the network NW and converts signals input to and output from the server 100 in accordance with a communication scheme of the network NW.

(Musical Performance Support Mode)

Next, a musical performance support mode according to the embodiment will be described.

As illustrated in FIG. 10, a control unit 52A of the operation device 50A functions as a guidance information processing unit 532 in addition to the functions descried above in the first embodiment.

In the embodiment, in a case in which a practice for musical performance is performed using a musical instrument MI with a sensor device 10 attached thereto, an arithmetic control unit 16 of the sensor device 10 transmits transmission information including a detection signal from an acceleration sensor 12 to the operation device 50A via a communication module 18. The control unit 52A (guidance information processing unit 532) of the operation device 50A generates practice result information regarding a result of the practice using the transmission information acquired from the sensor device 10 during the practice. Then, the control unit 52A (guidance information processing unit 532)

transmits the practice result information along with user specification information for specifying the user to the server 100.

Here, the practice result information may include, for example, (A) evaluation of a musical performance state generated in the musical performance support mode illustrated in FIG. 5 and a history thereof. Also, the practice result information may include, for example, (B) information regarding commands to external devices (E1 and E2) such as effectors and timings thereof. The instructor can use the information to perform evaluation and the like of a reaction of the user in response to the evaluation of the musical performance state and a degree of skill for effector operations. Note that the practice result information is not limited thereto.

The control unit 102 (musical performance support data processing unit 112) of the server 100 receives the practice result information, specifies the instructor who is in charge of the user from the user specification information, and transmits the practice result information to the instructor terminal 200 of the instructor.

The instructor creates guidance information including advice for the user with reference to the practice result information received from the server 100 using the instructor terminal 200 and transmits the guidance information to the server 100. The control unit 102 (musical performance support data processing unit 112) of the server 100 transmits the guidance information to the operation device 50A. The user can receive the guidance information from the server 100 and use the guidance information as a reference for practice. This enables the user to receive remote instruction for music at an arbitrary timing without going to a music school.

Here, the guidance information may include text information including a musical score of music that the user practices. Also, the text information may be viewed or downloaded from the server 100 by the user.

Figure 12:
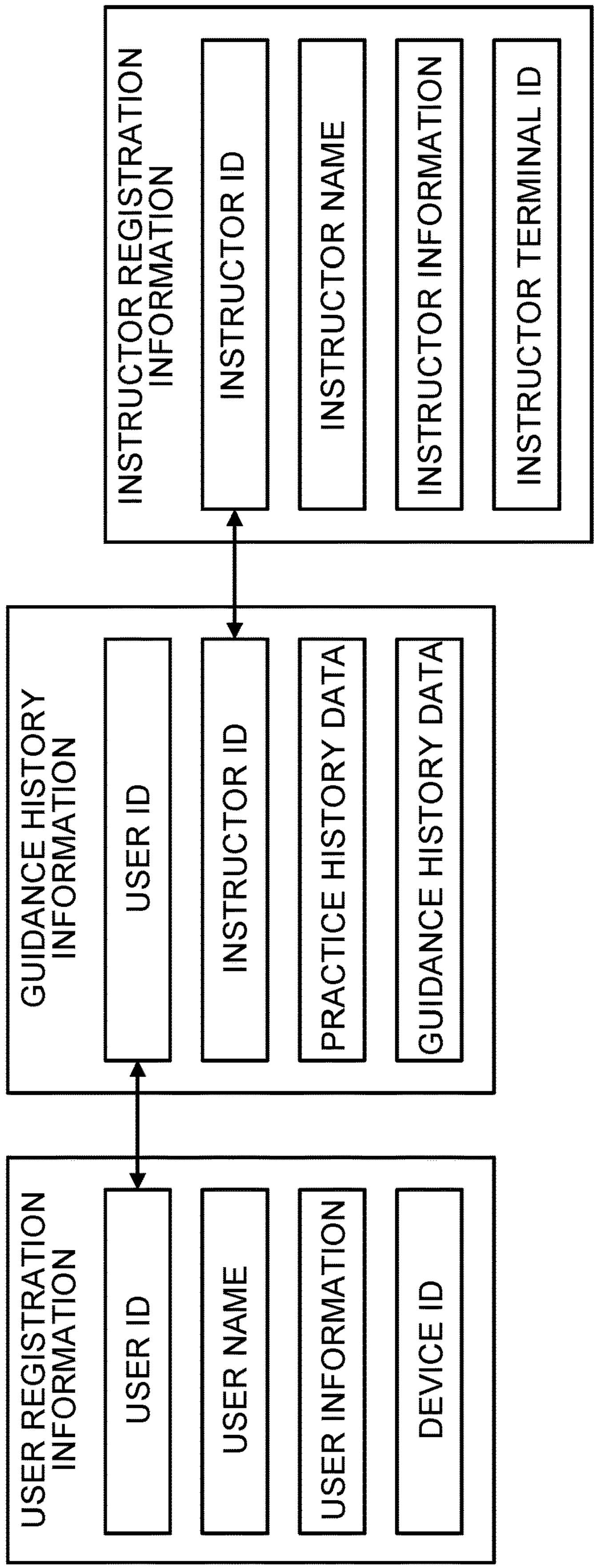
FIG. 12 is a block diagram illustrating a relationship of data used in a musical performance support method according to the second embodiment of the present invention.

FIG. 12 is a block diagram illustrating a relationship of data used in a musical performance support method according to the second embodiment of the present invention.

As illustrated in FIG. 12, a relationship database including user registration information, instructor registration information, and guidance history information is used in the embodiment. The server 100 can support practice for musical performance between the operation device 50A of the user and the instructor terminal 200, using the database.

The user registration information includes, as user specification information, a user ID individually assigned to the user and a device ID individually assigned to the operation device (IDs of the sensor device 10 and the operation device 50A). The user registration information includes, as information regarding the user, a user name (a full name, for example) and user information (for example, contact information such as an address, a phone number, and an e-mail address, information regarding utilization of the system according to the embodiment (the musical performance support system and the musical instrument management system), and other individual information).

The instructor registration information includes, as instructor specification information, an instructor ID and an instructor terminal ID individually assigned to the instructor and the instructor terminal 200, respectively. Moreover, the instructor registration information includes an instructor name (a full name, for example) and instructor information (for example, contact information such as an address, a phone number, and an email address, information regarding utilization of the system according to the embodiment, and other individual information).

Here, as the device ID and the instructor terminal ID, it is possible to use, for example, an Internet protocol (IP) address and a media access control (MAC) address. Also, in a case in which the operation device 50 or the instructor terminal 200 is a smartphone, a phone number can also be used as the device ID and the instructor terminal ID. Moreover, it is also possible to specify the user and the instructor only with the device IDs without using the user ID and the instructor ID.

The user ID is stored in association with the instructor ID of the instructor who is in charge of the user in the guidance history information, such that a correspondence between the user and the instructor who is in charge of the user is specified. In a case in which a plurality of instructors are in charge of one user depending on types of musical instruments, the user ID and the instructor IDs and information indicating the types of the musical instruments of which the instructors who are in charge of the user are in charge may be stored in an associated manner. The guidance history information includes practice history data and guidance history data.

The practice history data is obtained by accumulating data regarding the practice result received from the operation device 50A of the user. The practice result data can be used in conjunction with a schedule management (calendar) application or a task management application that is a cloud service to manage a practice schedule and actual achievement (for example, tasks provided by the instructor, a practice time, or a score achievement state). Such a cloud service may be provided via the server 100.

The guidance history data is accumulated guidance information transmitted from the instructor terminal 200 to the user.

The control unit 102 of the server 100 can call data included in each type of information as needed using the user ID or the instructor ID as a main key.

Figure 13:
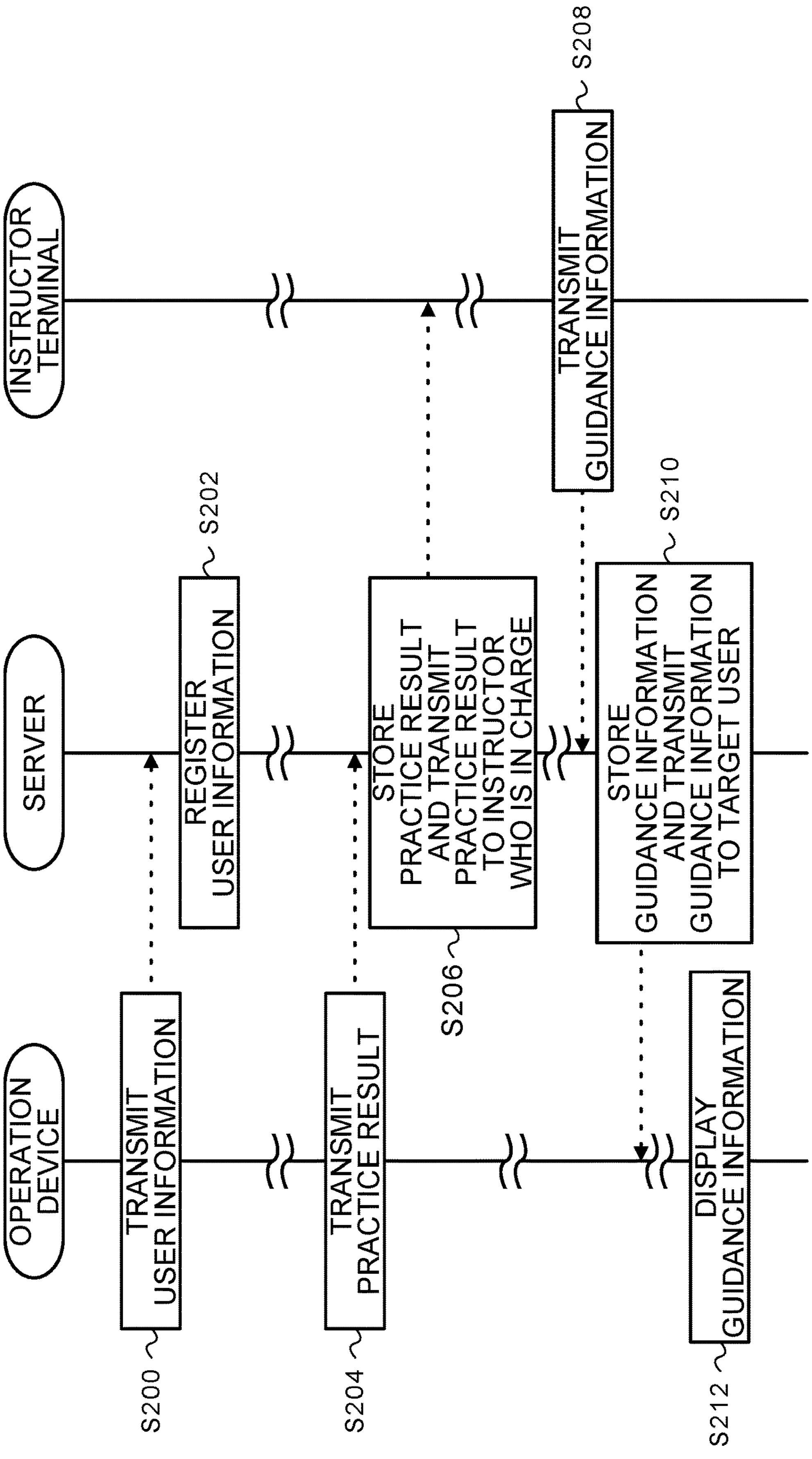
FIG. 13 is a flowchart illustrating the musical performance support method (musical performance guidance) according to the second embodiment of the present invention.

FIG. 13 is a flowchart illustrating a musical performance support method (musical performance guidance) according to the second embodiment of the present invention.

First, user information is registered before the musical performance support function of the system (musical performance support system) according to the embodiment is used. In other words, the user information is transmitted from the operation device 50A (Step S200), and the server 100 registers the user information as user registration information (Step S202).

Next, if practice for musical performance of the musical instrument MI using the musical performance support mode illustrated in FIG. 5 is ended, then the user ID and practice result information are transmitted from the operation device 50A to the server 100 (Step S204).

The control unit 102 (musical performance support data processing unit 112) of the server 100 calls practice history data included in corresponding guidance history information based on the received user ID and accumulates the practice result information therein. Then, the control unit 102 (musical performance support data processing unit 112) specifies the instructor who is in charge based on the received user ID and transmits the practice result information to the instructor terminal 200 of the specified instructor who is in charge (Step S206).

The instructor views the practice result information of the user through the instructor terminal 200 and creates and transmits guidance information (information for providing a command regarding a practice menu and a music to the user, and advice for the user, for example) (Step S208).

The control unit 102 (musical performance support data processing unit 112) receives the instructor ID and the guidance information from the instructor terminal 200, then calls guidance history data included in the corresponding guidance history information based on the received instructor ID, and accumulates the guidance information therein. Then, the control unit 102 (musical performance support data processing unit 112) specifies the target user based on the received instructor ID and transmits the guidance information to the operation device 50A of the specified user (Step S206). The user can thus cause the operation device 50A to display the guidance information and view the guidance information (Step S212).

According to the embodiment, the user can receive remote guidance of music without going to a music school.

(Musical Instrument Management Mode)

Next, a musical instrument management mode according to the embodiment will be described.

In this example, it is possible to perform management of the musical instrument MI with the sensor device 10 attached thereto, using a device ID registered in the server 100 and a communication function of the sensor device 10.

Figure 14:
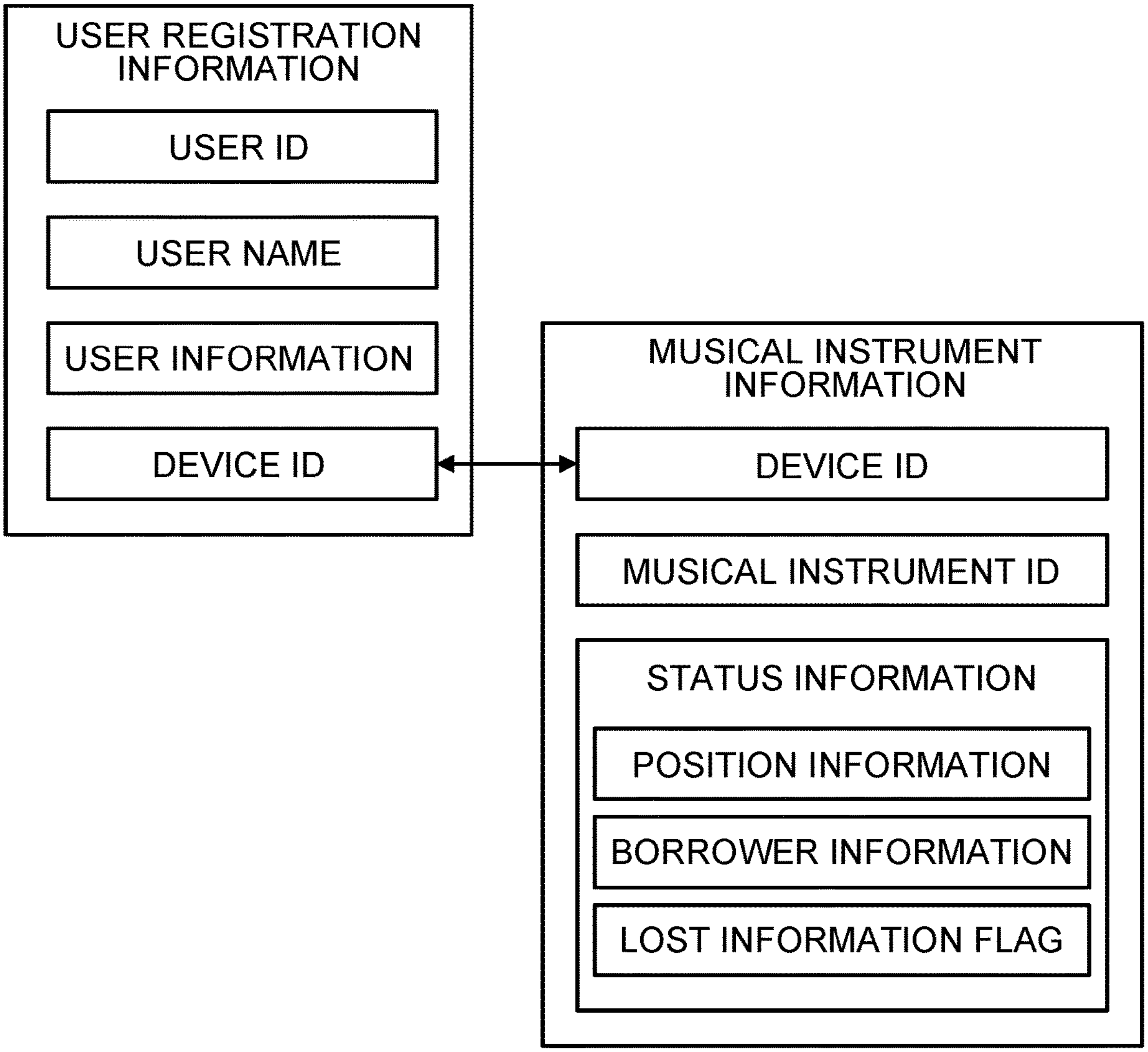
FIG. 14 is a block diagram illustrating a relationship of data used in a musical instrument management method according to the second embodiment of the present invention.

FIG. 14 is a block diagram illustrating a relationship of data used in the musical instrument management method according to the second embodiment of the present invention.

The musical instrument information includes information regarding the musical instrument MI that the user owns and is associated with user registration information via a device ID of the sensor device 10 attached to the musical instrument MI. The musical instrument information includes a musical instrument ID indicating the type or the like of the musical instrument MI and status information in addition to the device ID. The status information includes, for example, position information (for example, the latest position information acquired immediately before) of the musical instrument MI acquired from the sensor device 10. In a case in which the musical instrument MI is rented, the status information may include information regarding a borrower thereof. Also, the status information may include a lost information flag. ON/OFF of the lost information flag may be switched in response to an operation input from the operation device 50A.

Figure 15:
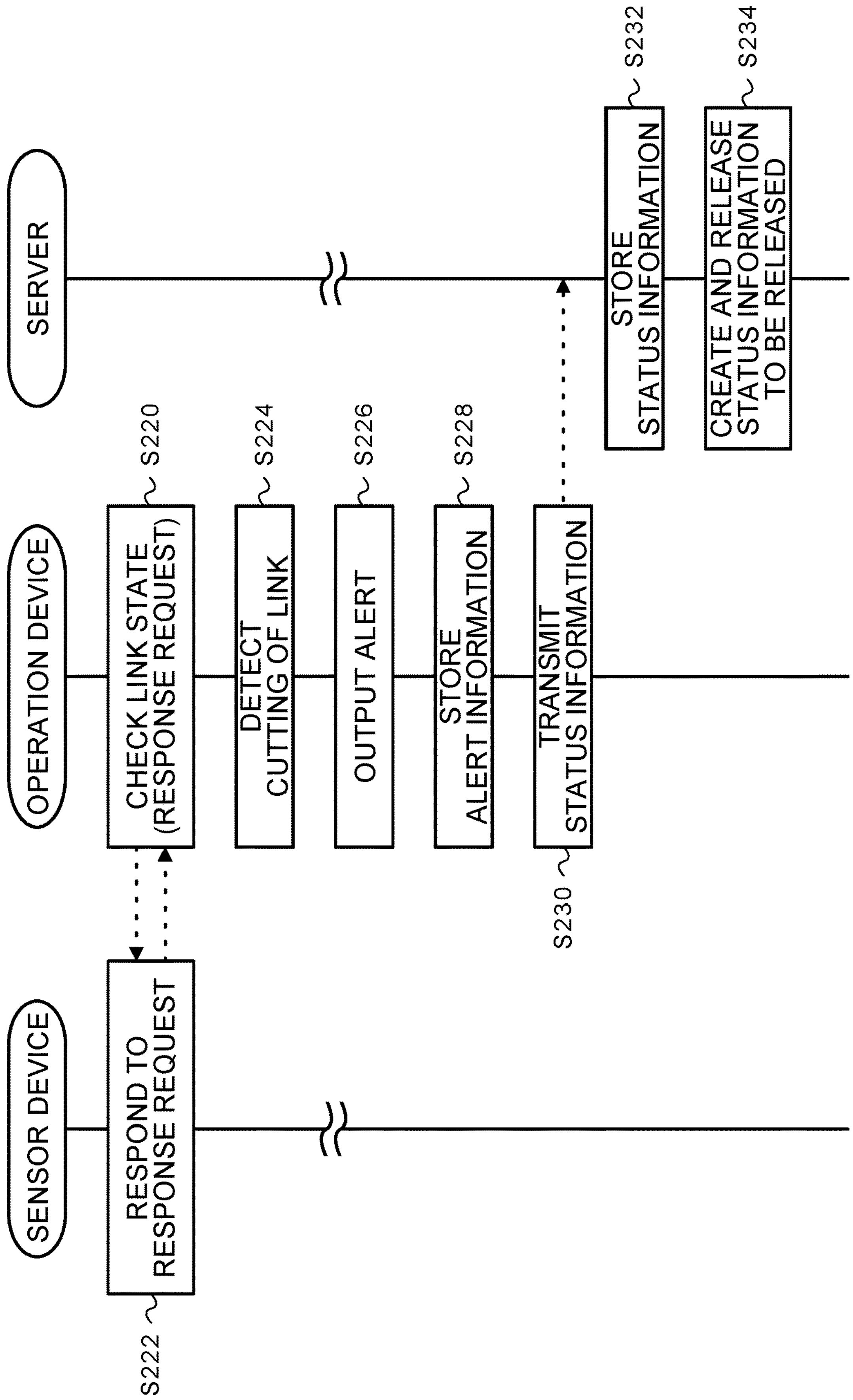
FIG. 15 is a flowchart illustrating the musical instrument management method according to the second embodiment of the present invention.

FIG. 15 is a flowchart illustrating the musical instrument management method according to the second embodiment of the present invention. Note that the processing in Steps S220 to S228 is similar to those in FIG. 8, and description thereof will thus be appropriately omitted.

First, the musical instrument management mode is set in the operation device 50, and a command to set the musical instrument management mode is transmitted to the sensor device 10. The arithmetic control unit 16 of the sensor device 10 receives the command to set the musical instrument management mode and is then brought into a response request waiting state.

The operation device 50 transmits a response request signal for requesting a response to the sensor device 10 at every predetermined time (Step S220). In a case in which a link state between the sensor device 10 and the operation device 50 is maintained, the response request signal reaches the sensor device 10, and a response signal in response to the response request signal is transmitted from the sensor device 10 to the operation device 50 (Step S222).

The control unit 52 (alert output unit 530) detects that the response signal is not received by the operation device 50 (cutting of the link) because the response request signal or the response signal does not arrive at the operation device 50 (Step S224), then outputs a control signal for providing a command to output an alert to the display control unit 60 and the audio output control unit 64, and performs alert display on the display unit 62 and an output of alert sound from the speaker 66 (Step S226).

Also, the control unit 52 (position information acquisition unit 528) acquires position information indicating the current position of the operation device 50 and stores, in the storage 54, the position information and the alert information including information regarding the date and the time when the cutting of the link has been detected (Step S228).

Next, the control unit 52 of the operation device 50 creates status information including owner information of the musical instrument MI with the sensor device 10 attached thereto and information for specifying the musical instrument MI and transmits, to the server 100, the status information in addition to the aforementioned position information and the information regarding the date and the time when the cutting of the link has been detected (Step S230).

The control unit 102 of the server 100 receives the status information from the operation device 50 and then stores the status information in the storage 104 (Step S232). Then, the control unit 102 (musical instrument status information processing unit 114) creates status information to be released in regard to the musical instrument MI from the received status information, such that the status information can be viewed through the network NW or the like (Step S234). Here, the status information to be released is the status information, which has been received from the operation device 50, from which user's individual information and the like have been deleted, for example. In Step S234, a range in which the status information to be released can be viewed may be limited within a specific network NW, for example. Note that the control unit 102 is an example of status information acquisition means according to the present invention.

According to the embodiment, it is possible to perform management of the musical instrument to prevent the musical instrument from being lost and stolen. Moreover, it is also possible to use the embodiment for discovery or the like of a theft of the musical instrument MI by creating and releasing the status information to be released in regard to the musical instrument. For example, the control unit 102 (musical instrument status information processing unit 114) releases, through the network NW, the status information of the musical instrument MI with the lost information flag set to ON. In this manner, in a case in which the musical instrument MI is brought to a used item market for musical instruments, it is possible for traders who purchase musical instruments to check the device ID of the operation device 50A registered in the server 100 and to use the device ID to prevent stolen items from being improperly traded.

Further, the embodiment can also be applied to a case in which the musical instrument MI is rented. For example, it is possible for the user to easily check where the musical instrument MI is present and the borrower thereof, by including information regarding a counterpart which the musical instrument MI is lent (borrower) in the status information.

Note that the position information (for example, access point information or GPS information) of the musical instrument MI with the sensor device 10 attached thereto may be able to be acquired by enabling the sensor device 10 to be connected to the network NW. In this manner, it is possible to check the position information of the musical instrument MI using the operation device 50A even in a case in which the musical instrument MI is left, and it is thus possible to prevent the musical instrument MI from being lost.

Other Embodiments

Note that although the musical performance support device and system and the musical instrument management device and system according to each of the aforementioned embodiments use the musical instrument tuner 1 or 1A including the acceleration sensor 12, the musical performance support device and system and the musical instrument management device and system may be configured with a sensor device including an acceleration sensor (not including a tuning function). Also, the tuning method, the musical performance support method, and the musical instrument management method according to each of the aforementioned embodiments can also be realized by software applied to a smartphone, a tablet terminal, or a personal computer or a non-transitory tangible recording medium that stores such software.

Also, although the sensor device 10 is provided with the acceleration sensor 12 in each of the aforementioned embodiments, the sensor device 10 may be provided with a microphone in addition to the acceleration sensor 12 or instead of the acceleration sensor 12. It is possible to perform tuning and musical performance support of the musical instrument such as a wind instrument in this case as well, similarly to each of the aforementioned embodiments, by the microphone collecting acoustic sound from the musical instrument MI. Also, in a case in which both the acceleration sensor 12 and the microphone are included, it is also possible to perform musical performance support based on motion detection according to each of the aforementioned embodiments.

Note that a portion where musical performance operations are performed and a speaker from which acoustic sound is emitted are brought into a separated positional relationship depending on the type of the musical instrument MI. In a case of a musical instrument MI with such a positional relationship, a difficulty in collecting acoustic sound regardless of attachment of the sensor device 10 including the microphone to the portion of the musical instrument MI where the musical performance operations are performed is conceivable. In such a case, the microphone for collecting acoustic sound from the musical instrument MI may be provided in the operation device 50, the acoustic sound from the speaker may be collected by the microphone of the operation device 50, and motions of the user during musical performance may be captured by the acceleration sensor 12 of the sensor device 10. In this manner, it is possible to perform evaluation and the like of a musical performance state of even a musical instrument (for example, an electronic musical instrument) that is not accompanied by vibrations caused by musical performance of the musical instrument, using acoustic signals acquired from the microphone and output signals from the acceleration sensor 12.

Also, in a case in which the musical instrument MI, such as a piano, is used in a stationary state, it is also possible to include the functions of the sensor device 10 in the operation device 50.

Moreover, although the acceleration sensor 12 having at least two detection axes is used in each of the aforementioned embodiments, detection of both vibrations caused by musical performance (musical sound) of the musical instrument MI and vibrations caused by motions of the user using the acceleration sensor with at least one axis capable of detecting gravitational acceleration is also conceivable. In this case, it is possible to separate the vibrations caused by musical sound from the vibrations caused by motions based on a difference between frequency regions thereof. Note that although it is necessary to adjust the direction of attachment of the acceleration sensor to the musical instrument MI in a case in which the one-axis acceleration sensor is used, an amplification rate of signals to be output from the acceleration sensor may be adjusted through detection of motions of the musical instrument MI using the acceleration sensor, or in a case in which signals output from the acceleration sensor are digital signals, signal processing such as integration may be performed.

REFERENCE SIGNS LIST

1, 1A Musical instrument tuner
10 Sensor device
12 Acceleration sensor
14 Waveform shaping circuit
16 Arithmetic control unit
18 Communication module
22 Signal selection unit
24 Frequency detection unit
30 Storage unit
32 Transmission information generation unit
34 Posture detection unit
50, 50A Operation device
52, 52A Control unit
54 Storage
56 Operation unit
58 Power source unit
60 Display control unit
62 Display unit
64 Audio output control unit
66 Speaker
68 Communication module
70 External connection I/F
520 Tuning information generation unit
522 Musical performance support information generation unit
524 Operation distinguishing unit
526 Link state detection unit
528 Position information acquisition unit
530 Alert output unit
532 Guidance information processing unit
100 Server
102 Control unit
104 Storage
106 Operation unit
108 Display unit
110 Communication module
112 Musical performance support data processing unit
114 Musical instrument status information processing unit
200 Instructor terminal
MI Musical instrument
E1, E2 External device

What is claimed is:

1. A musical instrument tuner comprising:

a sensor device that is attached to a musical instrument; and an operation device that is able to perform wireless communication mutually with the sensor device, wherein the sensor device includes:

an acceleration sensor that has at least two detection axes, frequency detection means for detecting, as a detected frequency, a frequency of a vibration of musical sound generated through an operation of the musical instrument based on a strongest output signal from among output signals of the at least two detection axes of the acceleration sensor or a synthesized value of the output signals of the at least two detection axes of the acceleration sensor, and sensor-side communication means for transmitting transmission information including information regarding the detected frequency to the operation device, and the operation device includes:

operation-side communication means for receiving the transmission information transmitted from the sensor device, display means, and control means for generating timing information of the musical instrument and causing the display means to display the tuning information based on the transmission information received from the sensor device.

2. The musical instrument tuner according to claim 1, wherein the acceleration sensor is a three-axis acceleration sensor that has three detection axes.

3. The musical instrument tuner according to claim 1, wherein the operation device further includes frequency deviation detection means for detecting a frequency deviation between the detected frequency and a reference frequency corresponding to a name of pitch that is a target of tuning.

4. The musical instrument tuner according to claim 3, wherein the operation device includes operation means for receiving a setting operation for the target of tuning, and the frequency deviation detection means sets the reference frequency based on the setting operation received by the operation means.

5. The musical instrument tuner according to claim 3, wherein the frequency deviation detection means sets the reference frequency based on the detected frequency detected by the frequency detection means.

6. The musical instrument tuner according to claim 3, wherein the sensor device includes posture detection means for detecting posture information of the musical instrument based on an output from the acceleration sensor, and the frequency deviation detection means sets the reference frequency based on the posture information detected by the posture detection means.

7. The musical instrument tuner according to claim 1, wherein the sensor-side communication means transmits a detection signal output from the acceleration sensor to the operation device, the operation-side communication means receives the detection signal transmitted from the sensor device, and the control means generates musical performance support information for assisting musical performance of a user in accordance with the detection signal during the musical performance of the musical instrument and controls display on the display means based on the musical performance support information.

8. The musical instrument tuner according to claim 7, wherein the control means evaluates a musical performance state in accordance with the detection signal and causes the display means to display a result of the evaluation of the musical performance state.

9. The musical instrument tuner according to claim 7, wherein the control means transmits a command in accordance with the detection signal to an external device communicably connected to the operation device.

10. The musical instrument tuner according to claim 7, wherein the control means causes the display means to display a musical score, detects a progress state of musical performance in accordance with the detection signal, and performs display indicating a part that is being played on the musical score, or turns a page of the musical score, in accordance with the progress state of the musical performance.

11. The musical instrument tuner according to claim 1, wherein the sensor-side communication means transmits a detection signal output from the acceleration sensor to the operation device, the operation device further includes alert output means, and the control means causes the alert output means to output an alert in a case in which a motion is detected by the acceleration sensor when the musical instrument with the sensor device attached thereto is not used.

12. The musical instrument tuner according to claim 1, wherein the operation device further includes alert output means, and the control means causes the alert output means to output an alert in a case in which disconnection of a link state between the sensor device and the operation device is detected.

13. The musical instrument tuner according to claim 12, wherein the operation device further includes position information storage means, and the control means acquires position information of the operation device at a timing when the disconnection of the link state is detected or position information of the operation device immediately before the disconnection of the link state is detected and stores the position information in the position information storage means in a case in which the disconnection of the link state between the sensor device and the operation device is detected.

* * * * *